(12) United States Patent
Uzawa

(10) Patent No.: US 8,112,706 B2
(45) Date of Patent: Feb. 7, 2012

(54) INFORMATION PROCESSING APPARATUS AND METHOD

(75) Inventor: Mitsuru Uzawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1438 days.

(21) Appl. No.: 11/387,809

(22) Filed: Mar. 24, 2006

(65) Prior Publication Data

US 2006/0221357 A1 Oct. 5, 2006

(30) Foreign Application Priority Data

Mar. 31, 2005 (JP) ................................. 2005-104363

(51) Int. Cl.
*G06F 17/00* (2006.01)
(52) U.S. Cl. ......... 715/243; 715/234; 358/1.1; 358/1.13
(58) Field of Classification Search .......... 715/241–247; 382/190; 358/1.15–1.19; 707/1
See application file for complete search history.

(56) References Cited

U.S. PATENT DOCUMENTS

| | | | |
|---|---|---|---|
| 5,907,835 A | 5/1999 | Yokomizo et al. | |
| 5,991,466 A | 11/1999 | Ushiro et al. | 382/305 |
| 6,466,329 B1 * | 10/2002 | Mukai | 358/1.15 |
| 7,295,333 B2 | 11/2007 | Sato | |
| 7,545,527 B2 * | 6/2009 | Matsuhara et al. | 358/1.15 |
| 2003/0115326 A1 * | 6/2003 | Verma et al. | 709/225 |
| 2004/0061728 A1 * | 4/2004 | Parry et al. | 347/5 |
| 2004/0150855 A1 | 8/2004 | Tonegawa | |
| 2004/0205099 A1 * | 10/2004 | Hagiwara | 709/200 |
| 2004/0223197 A1 | 11/2004 | Ohta et al. | 358/538 |
| 2004/0247206 A1 | 12/2004 | Kaneda et al. | 382/305 |
| 2005/0231757 A1 * | 10/2005 | Matsuda | 358/1.15 |
| 2006/0023239 A1 * | 2/2006 | Ferlitsch | 358/1.13 |
| 2006/0045386 A1 | 3/2006 | Fukuoka et al. | 382/305 |

FOREIGN PATENT DOCUMENTS

| | | |
|---|---|---|
| JP | 8161467 A | 6/1996 |
| JP | 11066051 A | 3/1999 |
| JP | 3017851 | 12/1999 |
| JP | 3017851 B2 | 3/2000 |
| JP | 2001256256 A | 9/2001 |
| JP | 2003196638 A | 7/2003 |
| JP | 2004139210 A | 5/2004 |
| JP | 2004206302 A | 7/2004 |
| JP | 2004227247 A | 8/2004 |
| JP | 2005028878 A | 2/2005 |

* cited by examiner

*Primary Examiner* — Quoc A Tran
(74) *Attorney, Agent, or Firm* — Fitzpatrick, Cella, Harper & Scinto

(57) ABSTRACT

When image data obtained by scanning a document is to be registered in a document management system, a search index can be generated by layout analysis and object analysis. However, when application data generated by an application is to be registered, similar analysis processing cannot be done, and a search index cannot be generated. Hence, an instruction of application data to be registered in the document management system is received, and it is checked if that application data can be processed by the document management system. If it is determined that the application data cannot be processed by the document management system, the application data is converted into PDL data (S756), and the application data or data as a combination of the PDL data and application data is transmitted to the document management system.

5 Claims, 33 Drawing Sheets

FIG. 4

| LAYOUT FEATURE AMOUNT | |
|---|---|
| BLOCK FEATURE AMOUNT | TEXT BLOCK FEATURE AMOUNT |
| | PHOTO BLOCK FEATURE AMOUNT |
| | TABLE BLOCK FEATURE AMOUNT |
| | LINE BLOCK FEATURE AMOUNT |

FIG. 13A

BLOCK INFORMATION

| | ATTRIBUTE | COORDINATE X | COORDINATE Y | WIDTH W | HEIGHT H | OCR INFORMATION |
|---|---|---|---|---|---|---|
| BLOCK1 | 1 | X1 | Y1 | W1 | H1 | PRESENT |
| BLOCK2 | 3 | X2 | Y2 | W2 | H2 | PRESENT |
| BLOCK3 | 2 | X3 | Y3 | W3 | H3 | ABSENT |
| BLOCK4 | 1 | X4 | Y4 | W4 | H4 | PRESENT |
| BLOCK5 | 3 | X5 | Y5 | W5 | H5 | PRESENT |
| BLOCK6 | 5 | X6 | Y6 | W6 | H6 | ABSENT |

*ATTRIBUTE 1:TEXT 2:PICTURE 3:TABLE 4:LINE 5:PHOTO

FIG. 13B

INPUT FILE INFORMATION

| TOTAL NUMBER OF BLOCKS | N(=6) |
|---|---|

FIG. 26

```
<file>
<original>
NfA5rHCxr4BISMjLigu·················································.
···················································································:
············································································.
</original>                                                    } 2301
<pdl>
Ex8bGRsjlR8kLk0yLioqLI5D···············································.
···················································································:
············································································.
</pdl>                                                         } 2302
<metaimage>
<V0>
  <H1>
    <T1>
      ┌─────────────────────────────────────────┐
      │ <index>                                 │──2304
      │    **********···········...            │
      │ </index>                                │
      └─────────────────────────────────────────┘
      ┌─────────────────────────────────────────┐──2307
      │ <vectorgraphic>                         │
      │    <path>5132···············</path>     │
      │ </vectorgraphic>                        │
      └─────────────────────────────────────────┘
    </T1>
    <T2>
      ┌─────────────────────────────────────────┐──2305
      │ <index>                                 │
      │    **********...                        │
      │ </index>                                │
      └─────────────────────────────────────────┘
      ┌─────────────────────────────────────────┐──2308
      │ <vectorgraphic>                         │
      │    <path>4423···············</path>     │
      │ </vectorgraphic>                        │
      └─────────────────────────────────────────┘
    </T2>                                                       } 2303
  </H1>
  <S1>
      ┌─────────────────────────────────────────┐──2306
      │ <index>                                 │
      │    **********···········...            │
      │ </index>                                │
      └─────────────────────────────────────────┘
      ┌─────────────────────────────────────────┐──2309
      │ <vectorgraphic>                         │
      │    <line>32516143</line>                │
      │ </vectorgraphic>                        │
      └─────────────────────────────────────────┘
  </S1>
  <H2>
      ···
      ···
  </H2>
</V0>
</metaimage>
</file>
```

INFORMATION PROCESSING APPARATUS AND METHOD

FIELD OF THE INVENTION

The present invention relates to an information processing apparatus and method and, more particularly, to information processing for a system such as a document management system which manages data.

BACKGROUND OF THE INVENTION

In recent years, amid calls for environmental issues, move to paperless offices has been promoted. Under the circumstance, the following system which implements reuse of objects, compressed storage of document images, and search for original documents of printed documents has been proposed (e.g., Japanese Patent No. 3,017,851). That is, this system scans paper documents such as documents accumulated and stored using binders or the like, distributed documents, and the like using a scanner, segments the scanned document images into objects by analyzing the layout of the scanned document images, and converts the objects into data by analyzing the objects.

As for the search for original documents, the following search method is suitably used. That is, feature amounts for respective attributes of objects such as text, photo, line image, and the like are calculated from original documents and scanned document images. Then, a plurality of similarities such as text similarity, photo similarity, layout similarity associated with the layout of respective objects, and the like are calculated, and their calculation results are comprehensively examined (such search will be referred to as a "compound retrieval").

According to the compound retrieval, it is possible to remarkably improve the search performance. Especially, since a document management system handles a wide variety of documents such as documents which include many objects with a text attribute to those which include many objects with photo and line attributes, the effectiveness of the compound retrieval is very high in consideration of search precision and search efficiency.

If a document to be registered in the document management system is digitized data generated by scanning a document image, it is possible to generate a search index based on information analyzed by layout analysis and object analysis. Likewise, if a document to be registered is image data of a raster format, it is possible to generate a search index based on analysis information. However, if a document to be registered is application data generated by an application which runs on a personal computer (PC), such data cannot undergo similar analysis processing, and a search index cannot be generated. In other words, application data of a document generated on the PC and digitized data obtained by scanning a document printed on a paper sheet cannot be equally handled.

Of course, as for a general-purpose application which is frequently used in the office, a program which analyzes data of that application is incorporated in the document management system as a module. Then, application data is rasterized and undergoes analysis processing in the same manner as a scanned document image to generate a search index. However, since it is impossible to prepare for the aforementioned analysis module for all applications, the search index of application data which cannot be rasterized by the document management system cannot be generated by the analysis processing.

SUMMARY OF THE INVENTION

The first aspect of the present invention discloses an information processing method comprising the steps of:
setting application data to be registered in a data management system;
determining whether or not the application data can be processed by the data management system;
converting the application data which cannot be processed by the data management system into drawing data; and
transmitting the set application data or registration data as a combination of the drawing data of the application data and the application data to the data management system in accordance with a determination result of the determining step.

The second aspect of the present invention discloses an information processing method comprising the steps of:
receiving registration data to be registered in a data management system;
converting the application data into image data of a bitmap format when the registration data has an application data format;
rendering the drawing data into image data of a bitmap format when the registration data has a drawing data format:
generating search information of the registration data based on the image data of the bitmap format; and
registering the application data and the search information in a memory of the data management system by associating the registration data of the application data format or application data included in the registration data with the search information.

The third aspect of the present invention discloses an information processing method comprising the steps of:
setting application data;
converting the application data into drawing data; and
transmitting the drawing data to a data management system as search data of data registered in the data management system.

The fourth aspect of the present invention discloses an information processing method comprising the steps of:
receiving drawing data used to search data registered in a data management system;
rendering the drawing data into image data of a bitmap format;
generating search information based on the image data of the bitmap format; and
searching the data registered in the data management system based on the search information.

In a fifth example embodiment, an information processing apparatus is disclosed. Application data to be registered in a data management system is set by a setter. The application data is checked by a determiner to determine whether or not the application data can be processed by the data management system. Application data which cannot be processed by the data management system is converted into drawing data by a converter. Application data set by the setter, or registration data, as a combination of the drawing data of the application data and the application data, is transmitted by a transmitter to the data management system in accordance with a determination result of the determiner.

In a sixth example embodiment, an information processing apparatus is disclosed. Registration data to be registered in a data management system is received by a receiver. Application data is converted into image data of a bitmap format by a converter when the registration data has an application data format. Drawing data is rendered into image data of a bitmap format by a rendering section when the registration data has a drawing data format. Search information of the registration data is generated by a generator based on the image data of the bitmap format. Application data and the search information is registered by a registering section into a memory of the data management system by associating the registration data of the application data format or application data included in the registration data with the search information.

According to the present invention, application data can be registered in the digitized data management system to allow search. Therefore, the document management system can equally handle image data scanned from a paper document and application data. Also, data which is registered in the data management system can be searched based on application data. Therefore, upon conducting a search in the document management system, image data scanned from a paper document and application data can be equally handled.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows the configuration of a search index;

FIGS. 13A and 13B show an example of the block selection result;

FIG. 26 shows an example of document data to be registered in the document management system;

DESCRIPTION OF THE PREFERRED EMBODIMENTS

A document management system as an embodiment of a data management system according to the present invention will be described in detail hereinafter with reference to the accompanying drawings.

First Embodiment

[Image Processing System]

Figure 1:
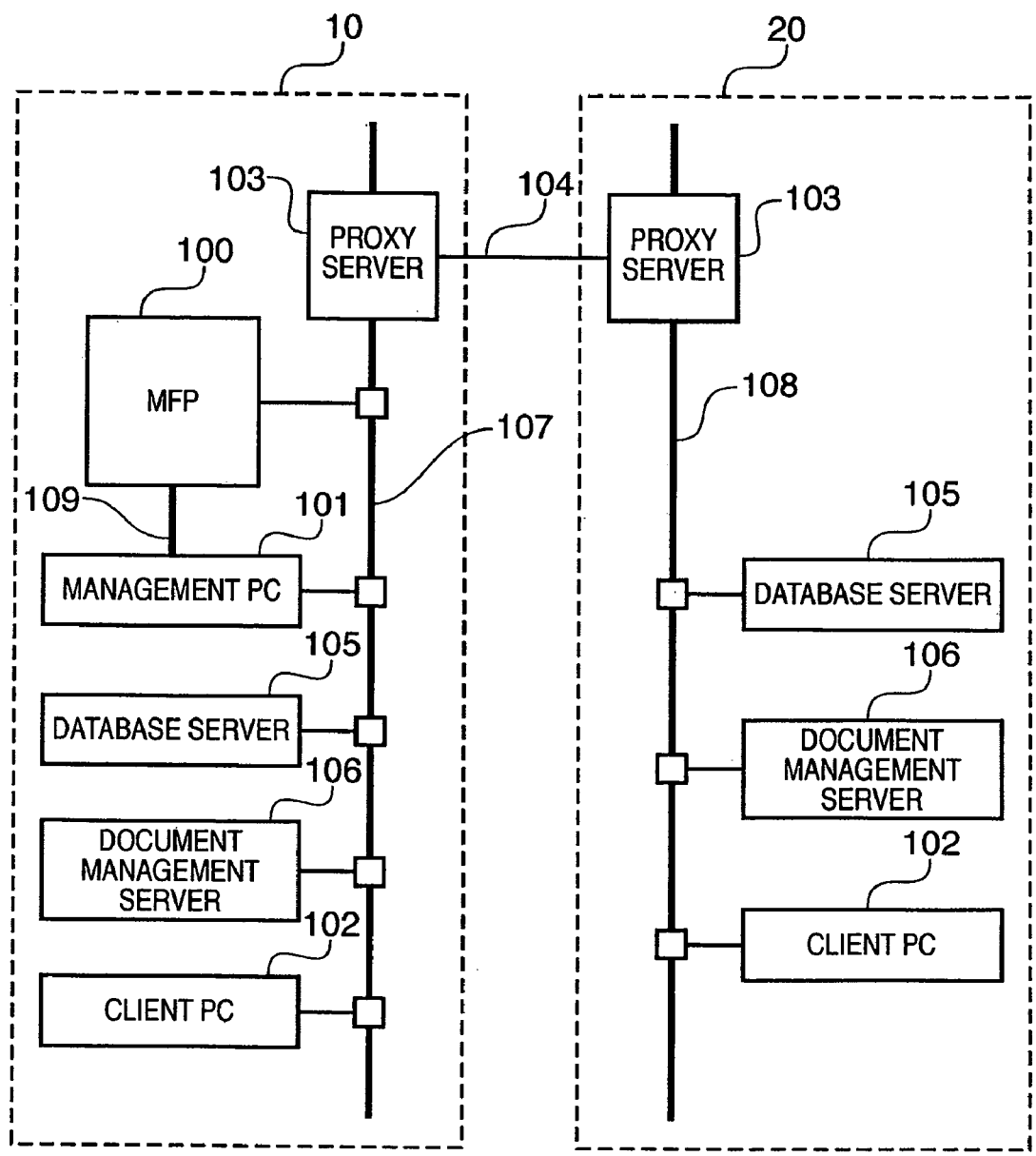
FIG. 1 is a block diagram showing the arrangement of a document management system which digitizes information using a multi-functional peripheral equipment (MFP)

FIG. 1 is a block diagram showing the arrangement of an image processing system which digitizes information using a multi-functional peripheral equipment (MFP).

This document management system is implemented in an environment in which offices (or a plurality of office-like partitions) 10 and 20 are connected via a wide area network (WAN) 104 such as the Internet or the like.

To a local area network (LAN) 107 formed in the office 10, an MFP 100, management PC 101, client PC 102, document management server 106, database server 105, and the like are connected. The management PC 101 controls the MFP 100, and the document management server 106 manages the database server 105. The office 20 has substantially the same arrangement as that of the office 10. To a LAN 108 formed in the office 20, at least a document management server 106, a database server 105 managed by the document management server 106, the client PC 102, and the like are connected. The LANs 107 and 108 of the offices 10 and 20, respectively, are connected to each other via a proxy server 103 connected to the LAN 107, the WAN 104, and another proxy server 103 connected to the LAN 108.

In the document management system shown in FIG. 1, the registration location of test documents is not particularly limited. That is, documents may be stored in any of the storage unit of the MFP 100, that of the management PC 101, and the database server 105. The registration location of documents can be accessed via the LAN 107 or 108 so as to allow search of registered documents.

Information processing to be described later can be implemented on an arbitrary apparatus of the document management system shown in FIG. 1. One or all of a data processor (to be described later) of the MFP 100, the management PC 101, and the document management server 106 may have a function of executing the information processing.

Management PC

Figure 2:
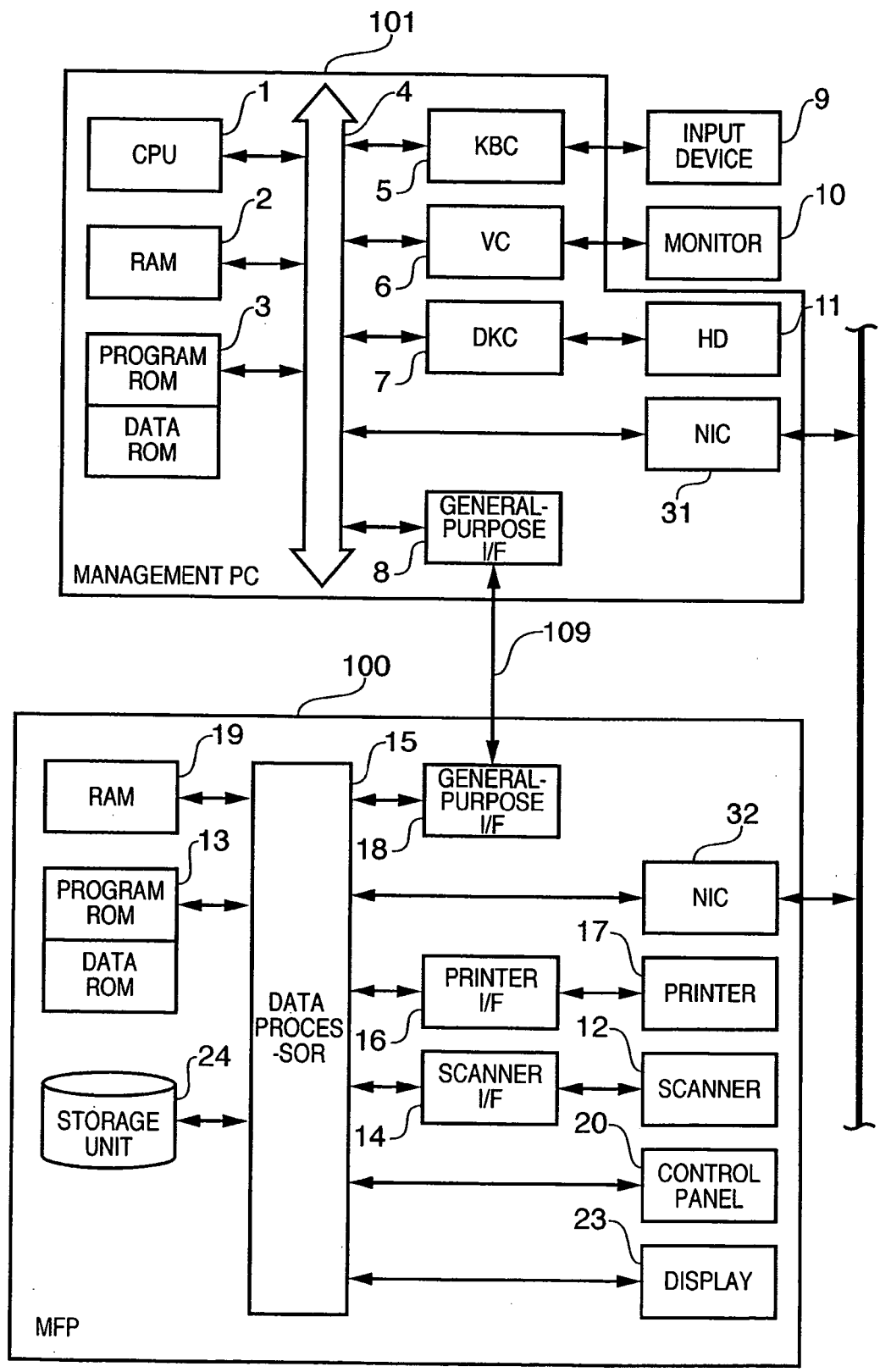
FIG. 2 is a block diagram showing the arrangement of a management PC and the MFP.

FIG. 2 is a block diagram showing the arrangement of the management PC 101 and MFP 100.

A CPU 1 of the management PC 101 executes an operating system (OS) and programs stored in a program ROM of a ROM 3 or hard disk (HD) 11 using a RAM 2 as a work memory. The CPU 1 systematically controls respective units connected to a system bus 4, and executes control of the MFP 100, information processing (to be described later), and the like. The CPU 1 executes an application program stored in the HD 11 to process a document which includes picture data, photo image data, text data, line image data, table data, computer graphics (CG) data, and the like together.

The program ROM of the ROM 3 or the HD 11 stores a driver program for the document management system. A data ROM of the ROM 3 or the HD 11 stores various data used in case of document processing and the like. Furthermore, the HD 11 stores font data and the like used in the document processing.

A keyboard controller (KBC) 5 controls inputs from an input device 9 which includes a keyboard and a pointing device such as a mouse or the like. A video card (VC) 6 controls display on a monitor 10. A disk controller (DKC) 7 controls read/write accesses to the HD 11 which stores various programs and various data. A network interface card (NIC) 31 controls data exchange with the LAN 107. A general-purpose interface (I/F) 8 comprises a serial bus such as Universal Serial BUS (USB), IEEE1394, or the like, and is connected to the MFP 100 via a communication line 109.

Note that the client PC 102 has substantially the same arrangement and functions as those of the management PC 101, except that it is not connected to the MFP 100 via the communication line 109. Therefore, the operations and functions of the management PC 101 to be described below apply intact to those of the client PC 102, except for a description that pertains to the control of the MFP 100.

The CPU 1 opens various windows and executes various kinds of data processing based on instructions input by the user via a user interface displayed on the monitor 10 by operating the input device 9. When the user wants to print or register a document, he or she opens a print or registration window. This print or registration window is a user interface provided by driver software of the document management system. The user can make, using the window, various settings and selections including settings of a printer, settings of a print mode, selection of a storage unit where documents are registered (or where a document is to be registered), and settings of a registration mode.

MFP

As shown in FIG. 2, the MFP 100 has a general-purpose I/F 18, RAM 19, ROM 13, printer I/F 16 and printer 17, scanner I/F 14 and scanner 12, control panel 20, display 23, and storage unit 24 centering around a data processor 15 which comprises a CPU. The control panel 20 has a keyboard and touch panel. The display 23 comprises an LCD or the like. The storage unit comprises an HD or the like.

The data processor 15 systematically controls the MFP 100 based on control programs stored in a program ROM of the ROM 13 or the storage unit 24 using the RAM 19 as a work memory. Also, the data processor 15 controls the following processing based on an image processing program stored in the program ROM of the ROM 13 or the storage unit 24.

The data processor 15 displays a user interface on the display 23, and accepts an instruction from the user who operates the control panel 20. When the user inputs a document copy instruction, the data processor 15 controls the scanner 12 having an auto document feeder (ADF). The data processor 15 controls the scanner 12 to irradiate an image on each of one or a plurality of stacked documents with light, and to form an image of light reflected by the document on a solid-state image sensing element via a lens. Then, the data processor 15 obtains a read image signal (e.g., 600 dpi, 8 bits) in the raster order from the solid-state image sensing element. The data processor 15 converts this read image signal into a print signal. When an image is copied on a plurality of print sheets, the data processor 15 temporarily stores a print signal for one page in the storage unit 24, and repetitively outputs the print signal to the printer 17, thus forming images on those print sheets.

On the other hand, print data output from the client PC 102 is input to the NIC 32 via the LAN 107. The print data is converted into printable raster data by the data processor 15, and is formed by the printer 17 as an image on a print sheet.

The data processor 15 communicates with the management PC 101 via the general-purpose I/F 18, transmits the state of the MFP 100, image processing results, and the like to the management PC 101, and receives instructions and data from the management PC 101. Therefore, a user's instruction to the MFP 100 can be issued by the control panel 20 equipped on the MFP 100 and the input device 9 of the management PC 101.

Overview of Processing

Figure 3:
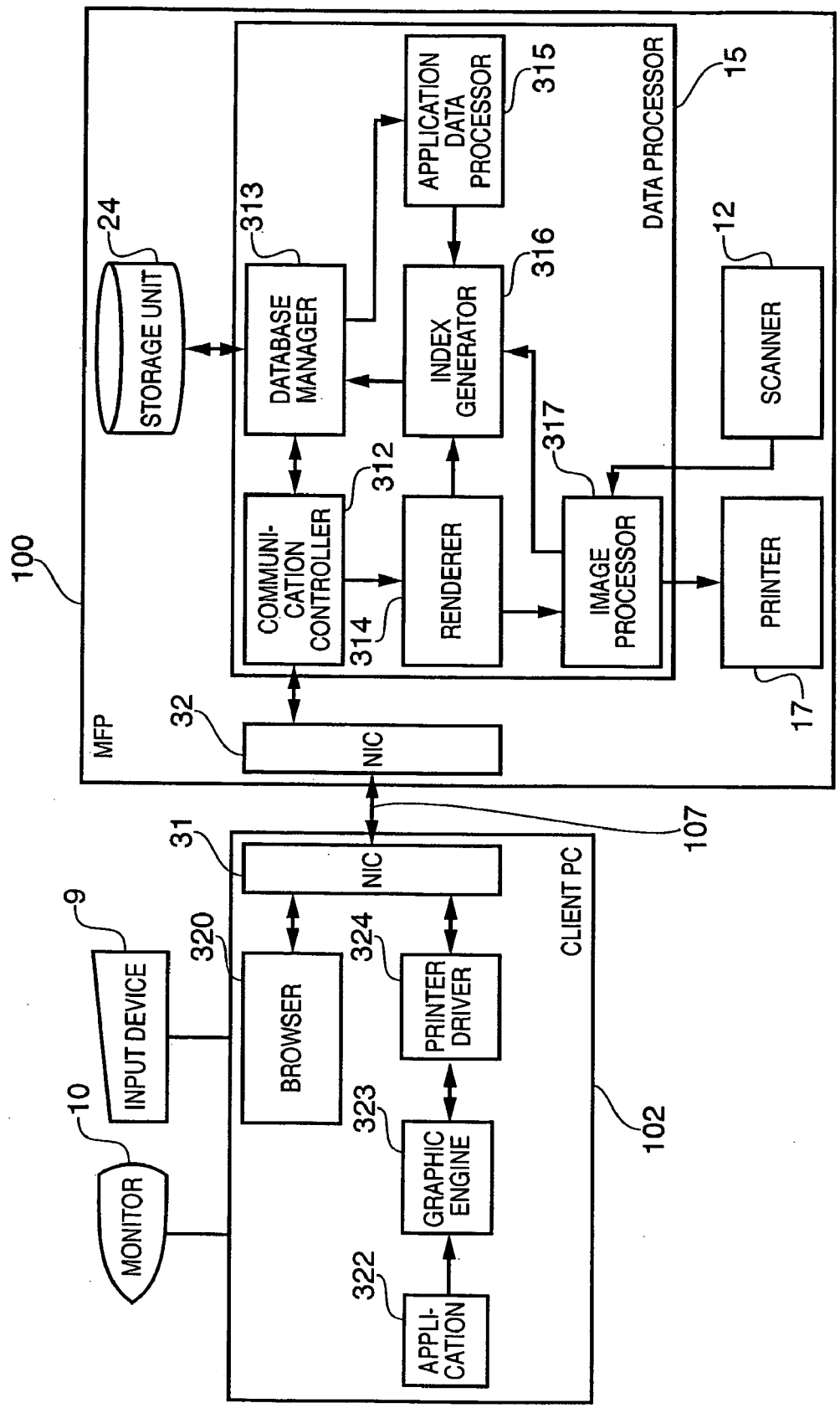
FIG. 3 is a functional block diagram for explaining document management processing by the management PC (or a client PC) and MFP.

FIG. 3 is a functional block diagram for explaining document management processing by the management PC 101 (or client PC 102) and the MFP 100.

The user registers a document in the storage unit 24 of the MFP 100, the HD 11 of the management PC 101, the database server 105, or the like by operating the management PC 101 or MFP 100. Or the user can search for original data of a document possessed by him or her or similar document data. In this case, the management PC 101 and MFP 100 display, on the display 23 or the monitor 1, the user's input including search designation contents, the state of the MFP 100, a document to be registered, the operation state of the document management system, the search status, the search result, a found document, and the like.

The user operates the client PC 102 connected to the management PC 101 and MFP 100 via the LAN 107 to supply application data stored in the HD 11 of the client PC 102 to the MFP 100. The user then can print a document, register a document in the document management system, search for original data of the document or similar document data, and print the found document, and the like.

When a document is to be printed, i.e., when a document displayed on the monitor 10 is to be printed by an application 322 which runs on the client PC 102, the user inputs a print instruction by operating the input device 9. Upon reception of the print instruction, the application 322 calls a printer driver 324, and passes an application data (GDI (Graphic Device Interface) drawing command (function)) to a graphic engine 323. The graphic engine 323 converts the GDI drawing command into a DDI (Device Driver Interface) drawing command (function), and passes it to the printer driver 324. The printer driver 324 converts the DDI drawing command into data which is described in a data description language such as a page description language (PDL) that can be interpreted by the printer (to be referred to as "PDL" data hereinafter), and transmits the converted data to the MFP 100.

Upon reception of a print job including the PDL data from the client PC 102 via a communication controller 312, the data processor 15 of the MFP 100 renders the received PDL data by a renderer 314 to convert it into a raster image. An image processor 317 applies various kinds of image processing to the raster image data, and the printer 17 prints an image on a print sheet.

[Document Management]

Registration and search processing of a document will be described below.

The document management system of this embodiment can search for original data registered in the system using a document image. Test documents have different features depending on documents like a document mainly anchored by text, a document made up of text and a table, a document made up of only a title (text) and table, a document made up of a photo and line image, and so forth. The document management system of this embodiment can cope with various kinds of documents, and conducts a search that takes an advantage of feature amounts of respective documents so as to precisely execute the search.

The document management system of this embodiment equally handles data generated based on an image scanned from a document (to be referred to as "digitized data" hereinafter) and application data and can register either data as a document. Therefore, when registered documents are searched based on a document possessed by the user, not only the digitized data but also application data can be searched. Since the search is conducted while equally handing the digitized data and application data, search indices are generated based on identical criteria from both the data, and the ratios of similarity are calculated based on identical criteria.

Generation of Search Index

FIG. 4 shows the configuration of a search index.

As will be described in detail later, a search index includes a layout feature amount and block feature amount. The layout feature amount uses information associated with a layout such as the position and size of each block (segment) obtained by segmenting a document image into blocks for respective attributes such as text, photo, table, line, picture, and the like.

The block feature amount is that for each block, includes a text code, font information, and the like for a block of a text attribute, or includes the number of cells, size, the number of ruled lines, and the like for a block of a table attribute. That is, a fine feature amount according to the attribute of a block is used as the block feature amount. Note that feature amounts used in the search index are calculated by the same analysis processing for both the digitized data and application data.

Registration of Digitized Data

Registration processing of digitized data will be described below. This processing may be executed by any of the CPU 1 of the management PC 101, the data processor 15 of the MFP 100, and a CPU 1 of the client PC 102. In the following description, assume that this processing is executed by the data processor 15 of the MFP 100.

The user sets (or selects) a storage unit in which a document is to be registered, and inputs information such as a registration mode and the like. In FIG. 3, the data processor 15 inputs a user's instruction, controls the scanner 12 to scan a document image, and also controls the image processor 317 to apply input image processing. The image processor 317 sends the processed image data to an index generator 316. The index generator 316 generates digitized data by performing the aforementioned segmentation processing, also generates a search index, and sends the digitized data and search index to a database manager 313. The database manager 313 registers the digitized data and search index in the storage unit set by the user in association with each other. Note that the registration location of the search index is sometimes different from that of the associated data. Generation and association of the search index will be described later.

Registration of Application Data

Processing for registering application data from the client PC 102 (or management PC 101) will be described below. This processing exploits interpretation of data described in a hypertext markup language (HTML) or the like, and an application 320 which supports a hypertext transfer protocol (http). Note that data described in HTML or the like will be referred to as "HTML data" hereinafter, and the application that supports http will be referred to as a "browser" hereinafter.

When the user designates a uniform resource locator (URL) (e.g., //docusys.xx.jp/, //192.168.100.35/, or the like) of the document management system by operating the browser 320, he or she receives HTML data from the document management system. In other words, the document management system also serves as a Web server. When the Web server of the document management system is designated using an IP address, the IP address of an apparatus (the MFP 100, management PC 101, or document management server 106) which executes software of the document management system must be designated. On the other hand, when a domain name ("docusys.xx.jp" in the above example) is designated, the browser 320 receives an IP address corresponding to the domain name from a domain name service (DNS) server on the network, and accesses the Web server of the document management system based on the received IP address.

Figure 5:
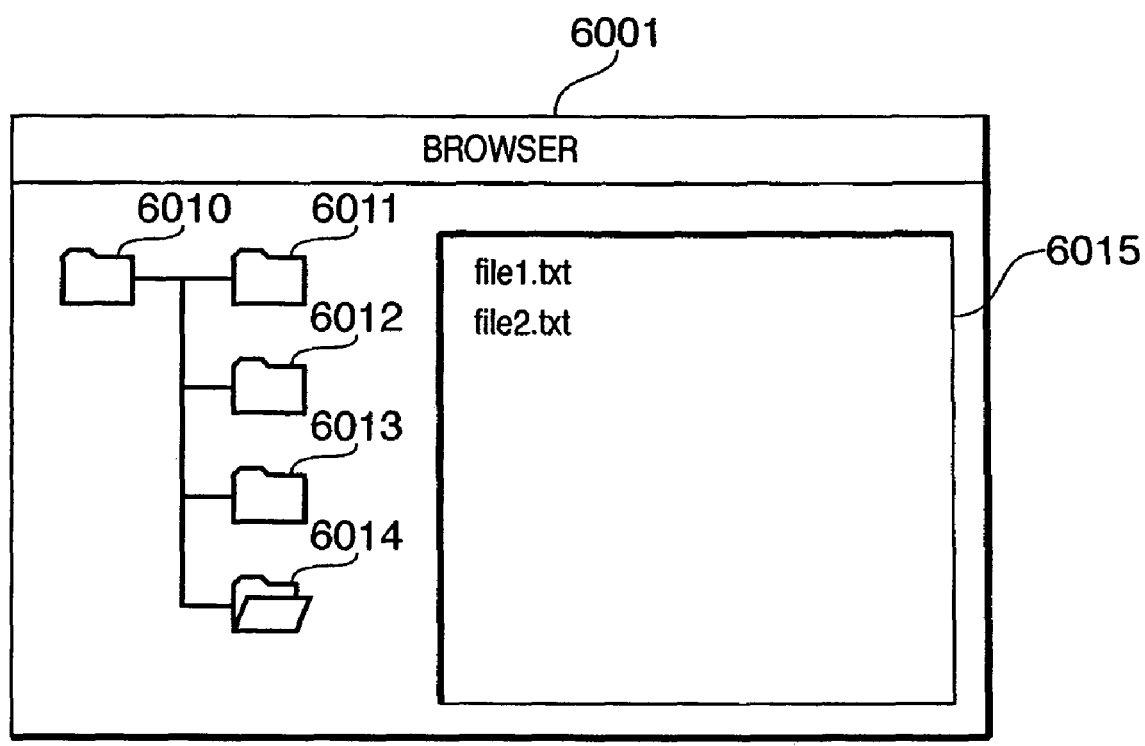
FIG. 5 shows a display example of HTML data.

FIG. 5 shows a display example of the received HTML data. In FIG. 5, a browser window 6001 displays the configuration of folders which are managed by the document management system and are to be provided to the user. A folder 6010 is a root folder for the user, and stores four lower folders 6011 to 6014. When the user designates a format "URL+folder" (e.g., //docusys.xx.jp/mine/), the folder configuration lower than the designated folder is displayed. For example, when the user selects the folder 6014 by clicking it, file names and the like stored in the folder 6014 are displayed on a window 6015. The user drags and drops an icon of application data to be registered in the document management system in the same manner as the operation of a window operating system. In this way, the user designates application data to be registered and its registration location to the browser 320.

Figure 6:
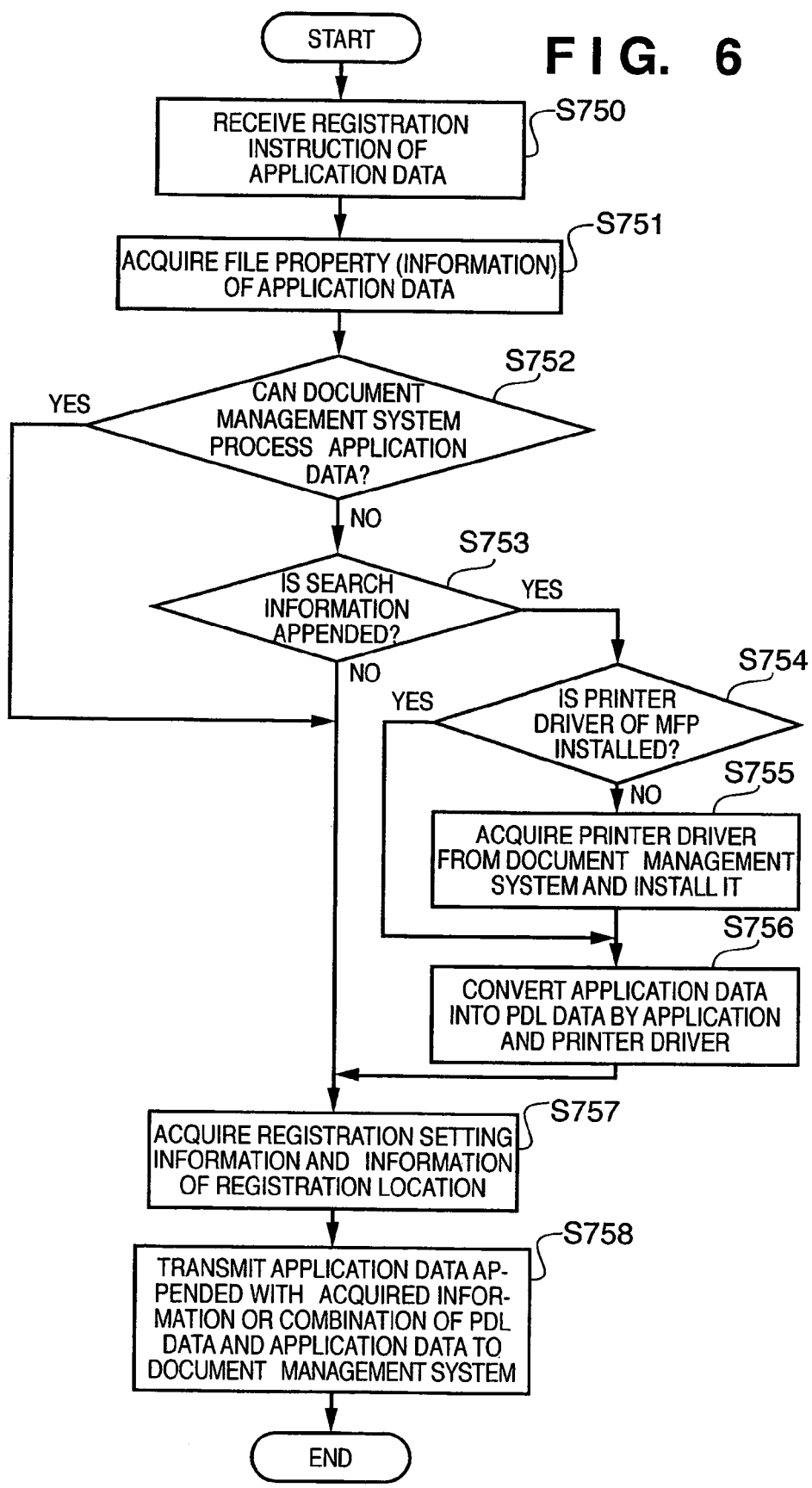
FIG. 6 is a flowchart showing processing to be executed by a browser before application data is registered.

FIG. 6 is a flowchart showing processing to be executed by the browser 320 upon registering application data. Note that this processing, for example, is implemented when the browser 320 executes a script such as JavaScript included in HTML data received from the document management system.

Upon reception of a registration instruction of application data from the user (S750), the browser 320 acquires a file property (information) of that application data (S751). The browser 320 checks based on the acquired file property (information) if the document management system can process the application data (S752). Note that "can process" means that the document management system can interpret and render the application data of interest in the same manner as the application which generated that application data. Checking step S752 may be attained by referring to the configuration of the binary level of the application data or based on a file extension of the application data.

If it is determined that the document management system can process the data, the browser 320 acquires registration setting information and information of the registration location, which are set in advance by the user in the browser 320 (S757). Then, the browser 320 sends the application data, to which the registration setting information and information of the registration location are appended as header information, to the document management system (S758).

On the other hand, if it is determined that the document management system cannot process the data, the browser 320 prompts the user to issue an instruction as to whether or not search information is appended (S753). Upon reception of an instruction indicating that the search information is not appended, the browser 320 sets a message indicating that no search information is appended in registration setting information, and acquires information of the registration location (S757). Then, the browser 320 sends the application data, to which the registration setting information and information of the registration location are appended as header information, to the document management system (S758).

Upon reception of an instruction indicating that search information is appended, the browser 320 checks if a printer driver for the document management system (i.e., that for the MFP 100) is installed in the client PC 102 (S754). If no printer driver is installed, the browser 320 acquires the printer driver from the document management system, and installs it in the client PC 102 (S755).

The browser 320 launches the application which generated the application data. Then, the browser 320 converts the application data into PDL data using a combination of the application 322, graphic engine 323, and printer driver 324, as shown in FIG. 3. After completion of conversion, the browser 320 quits the application 322 (S756). Next, the browser 320 acquires registration setting information and information of the registration location (S757), and sends a combination of the PDL data and application data, to which the registration setting information and information of the registration location are appended as, e.g., header information, to the document management system (S758).

In one embodiment, an apparatus is used to perform information processing of application data. Application data to be registered in a data management system is set by a setter. The application data is checked by a determiner to determine whether or not the application data can be processed by the data management system. Application data which cannot be processed by the data management system is converted into drawing data by a converter. Application data set by the setter, or registration data, as a combination of the drawing data of the application data and the application data, is transmitted by a transmitter to the data management system in accordance with a determination result of the determiner.

The document management system registers the data received from the client PC 102 in the storage unit. Note that the document management system may be executed by any of the CPU 1 of the management PC 101, the data processor 15 of the MFP 100, and the document management server 106. However, in the following description, assume that the document management system is executed by the data processor 15 of the MFP 100.

When the data processor 15 shown in FIG. 3 receives data by the communication controller 312, it refers to the header information of the data and sends that data to the database manager 313 if that data is to be registered in the storage unit. The database manager 313 checks with reference to the header information of the data if that data is application data. If the received data is application data, the database manager 313 sends that data to an application data processor 315.

The application data processor 315 generates bitmap image data by rendering the application data, and sends it to the index generator 316. The index generator 316 generates a search index and sends it to the database manager 313. The database manager 313 adds information extracted from the registration setting information to the search index, and registers the application data and search index in association with each other in the storage unit designated by the information of the registration location.

In case of application data in which a message indicating that no search information is appended to the header information of the data, the database manager 313 uses information extracted from the registration setting information as a search index. Then, the database manager 313 registers the application data and search index in association with each other in the storage unit designated by the information of the registration location.

Also, in case of application data combined with PDL data, the database manager 313 sends the PDL data to the renderer 314. The renderer 314 generates bitmap image data by rendering the PDL data and sends it to the index generator 316. The index generator 316 generates a search index and sends it to the database manager 313. The database manager 313 adds information extracted from the registration setting information to the search index, and registers the application data and search index in association with each other in the storage unit designated by the information of the registration location.

Details of Registration Using Printer Driver

Figure 7:
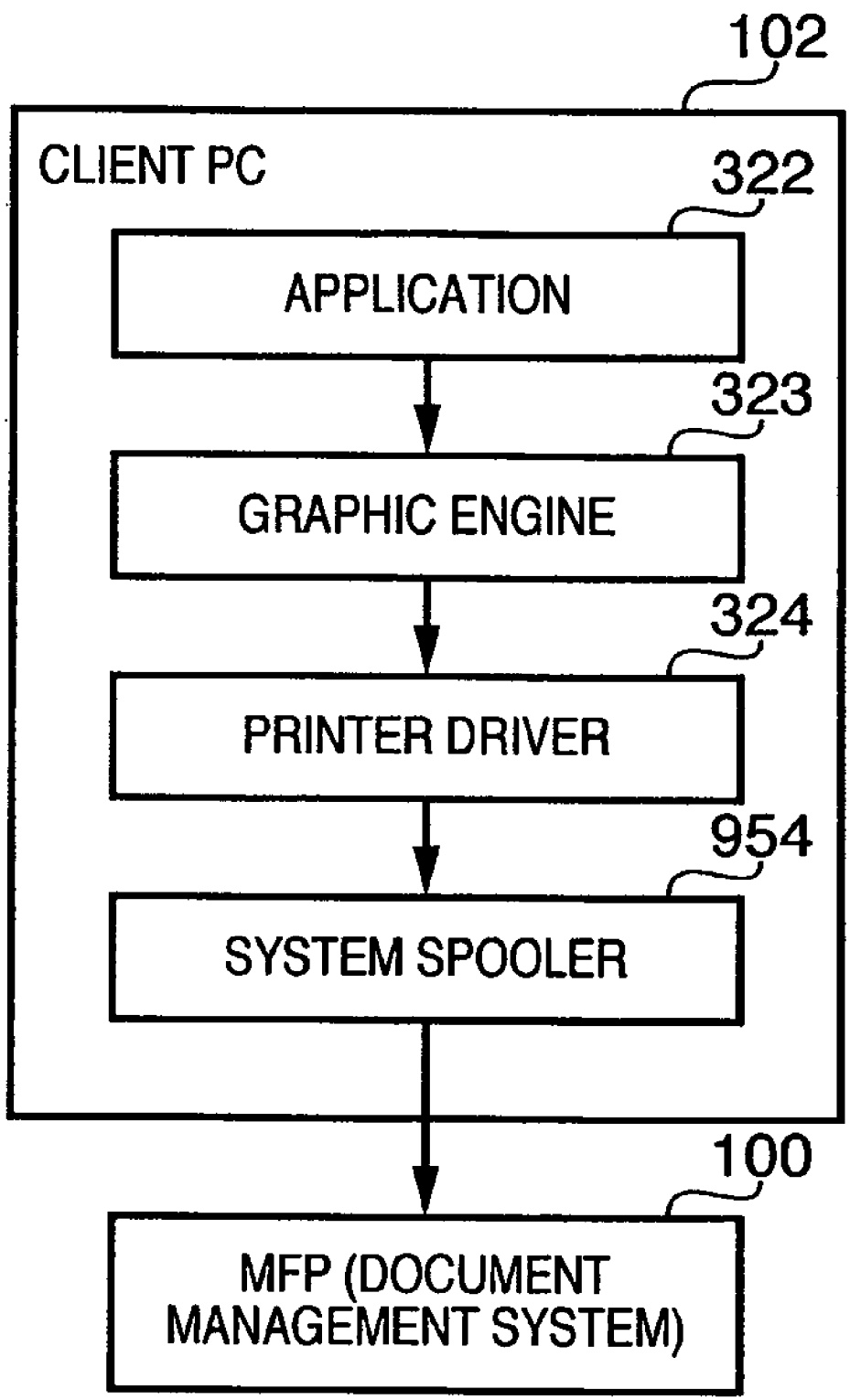
FIG. 7 is a diagram showing the registration arrangement of application data using a printer driver.

FIG. 7 shows the registration configuration of application data using the printer driver. This configuration is the same as that when the client PC 102 prints using the MFP 100. Note that the application 322, graphic engine 323, printer driver 324, and a system spooler 954 shown in FIGS. 3 and 7 are stored in the HD 11 as files. Also, these files are program modules which are loaded onto the RAM 2 by an OS or modules which use them when these files are executed. The application 322 and printer driver 324 can be added to (installed in) the HD 11 via a medium such as a CD-ROM or the like (not shown) or the LAN 107.

Upon execution of printing using the MFP 100, the application 322 outputs (renders) data using the graphic engine 323. The graphic engine 323 converts a GDI drawing command received from the application 322 into a DDI drawing command and sends it to the printer driver 324. The printer driver 324 converts the DDI drawing command (to be referred to as "print command" hereinafter) into PDL data that can be processed by the printer. The system spooler 954 outputs the PDL data to the MFP 100.

[Registration Using Printer Driver if Intermediate Code Spool Function is Available]

Figure 8:
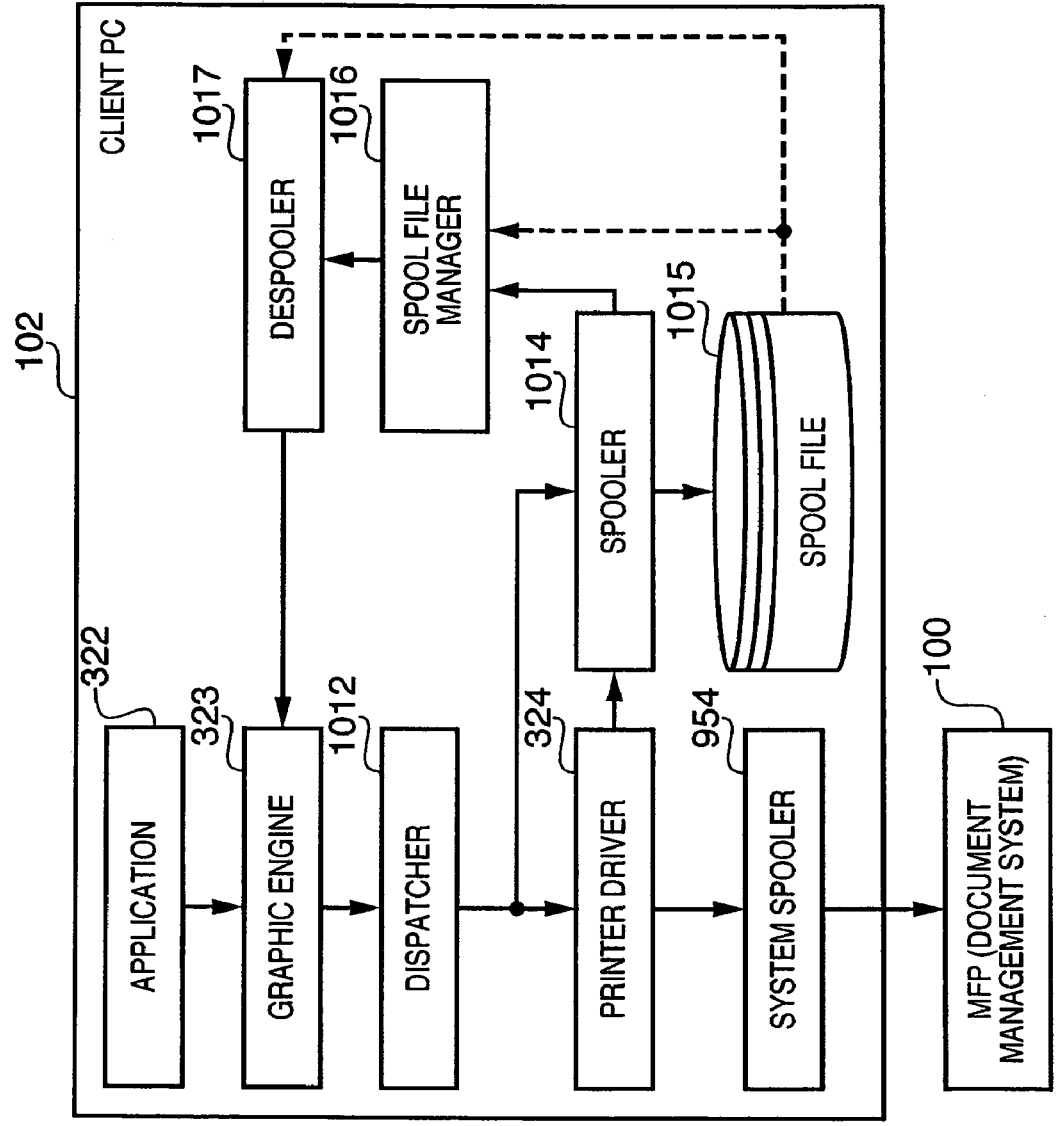
FIG. 8 is a diagram showing another example of the print or registration arrangement of application data using a printer driver.

FIG. 8 shows another example of the print or registration configuration of application data using the printer driver. This configuration is used when print or registration data is temporarily spooled as intermediate code data.

A spooler 1014 receives a print command sent from the graphic engine 323 to the printer driver 324, and generates a spool file 1015 including intermediate code data. In this manner, when the spooler 1014 converts all print commands into intermediate code data, and stores them in a spool file 1015, the application 322 is released from print processing. In other words, the application 322 is released from the print processing within a short period of time.

The intermediate code data stored in the spool file 1015 can be modified. That is, print or registration data can undergo functions which are not provided to the application 322, e.g., enlargement/reduction (zoom) processing, printing or registration after a plurality of pages are laid out on one page, and the like. In order to modify print or registration data in an intermediate code state, normally, settings are made via a user interface provided by the printer driver 324.

Referring to FIG. 8, a dispatcher 1012 receives a print command output from the graphic engine 323, and sends it to the spooler 1014 when the print command is issued from the application 322 to the graphic engine 323.

The spooler 1014 converts the received print command into intermediate code data, and stores the converted intermediate code data in the spool file 1015. The spooler 1014 acquires modification settings for print or registration data, which are set by the printer driver 324, from the printer driver 324, and stores them in the spool file 1014. Note that the spool file 1015 is normally assured as a file on the HD 11 but it may be assured on the RAM 2.

The spooler 1014 notifies a spool file manager 1016 of the generation state of the spool file 1015. Based on this notification, the spool file manager 1016 checks if the print or registration data stored in the spool file 1015 can be printed according to the modification settings. If it is determined that the data can be printed, the spool file manager 1016 instructs a despooler 1017 to execute print processing of the intermediate code data stored in the spool file 1015.

The despooler 1017 modifies the intermediate code data stored in the spool file 1015 according to the modification settings stored in the spool file 1015, and outputs the modified print or registration data via the graphic engine 323.

The dispatcher 1012 sends the print command to the printer driver 324 when that print command is issued from the despooler 1017 to the graphic engine 323.

The printer driver 324 converts the print command into PDL data, and sends that PDL data to the system spooler 954. The system spooler 954 outputs the PDL data to the MFP 100.

According to the configuration shown in FIG. 8, functions which are not normally available in the application 322, such as the zoom processing, multiple-page layout processing, and the like, can be implemented. Furthermore, in registration processing, digital data such as registration setting information, application data, or the like can be incorporated in PDL data.

Figure 9:
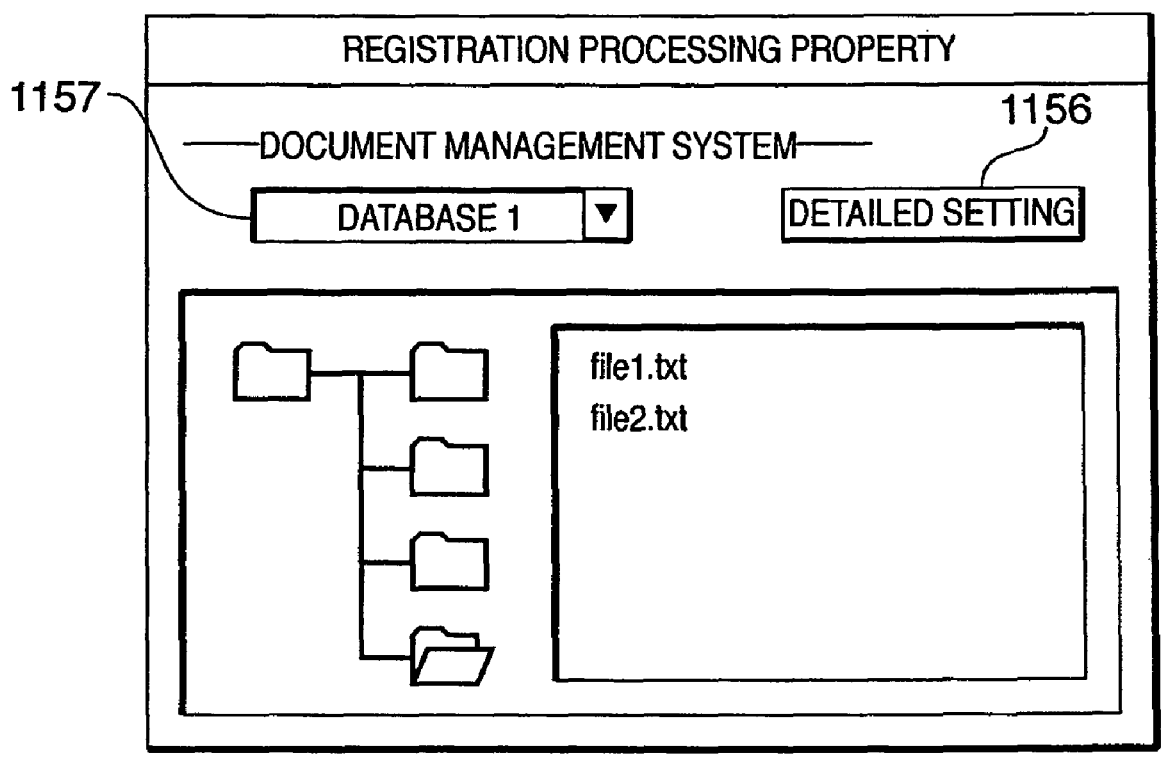
FIG. 9 shows a user interface provided by the printer driver upon document registration.

FIG. 9 shows a user interface which is provided by the printer driver 324 upon registering a document.

The printer driver 324 makes the same folder display (see FIG. 5) as that of the browser 320. The printer driver 324 displays a pull-down menu 1157 used to select the storage unit (displayed like "database 1" in FIG. 9) provided by the document management system, and a detail setting button 1156 used to set registration setting information and the like together with the folder display.

Registration of Application Data Incorporated in PDL Data

Figure 10:
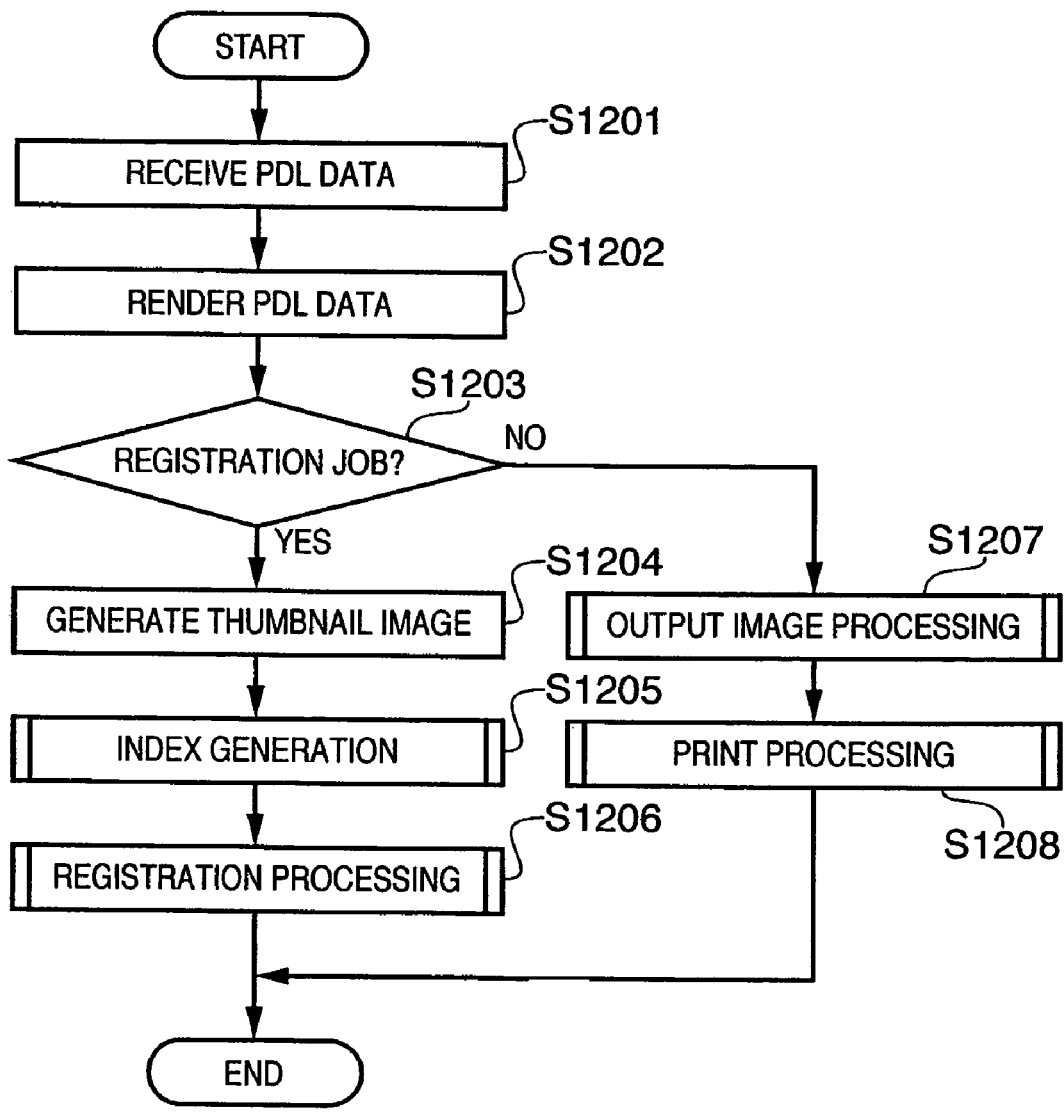
FIG. 10 is a flowchart for explaining processing for registering a document by interpreting PDL data by the document management system.

FIG. 10 is a flowchart for explaining processing for registering a document when the document management system interprets PDL data. This processing is executed by the data processor 15.

Upon reception of PDL data by the communication controller 312 (S1201), the data processor 15 shown in FIG. 3 sends the PDL data to the renderer 314 so as to control it to render the PDL data (S1202). When registration setting information and application data are incorporated in the PDL data, the renderer 314 extracts and appends them to rendered bitmap image data.

Next, the data processor 15 checks if the received data is a print job or registration job (S1203). If the received data is a print job, the data processor 15 sends the bitmap image data output from the renderer 314 to the image processor 317 to apply output image processing (luminance-density conversion, masking, UCR, gamma correction, halftoning, screen line processing, and the like) (S1207). The data processor 15 sends image data that has undergone the output image processing to the printer 17 to print an image (S1208).

On the other hand, if the received data is a registration job, the data processor 15 sends the bitmap image data, registration setting information, and application data to the index generator 316 to generate a thumbnail image (S1204) and to generate a search index (S1205). The data processor 15 then sends the thumbnail image, search index, registration setting information, and application data to the database manager 313. The data processor 15 adds information extracted from the registration setting information to the search index, and registers the thumbnail image, application data, and search index in the storage unit 24 or the like in association with each other (S1206).

[Generation Processing of Search Index]

Figure 11:
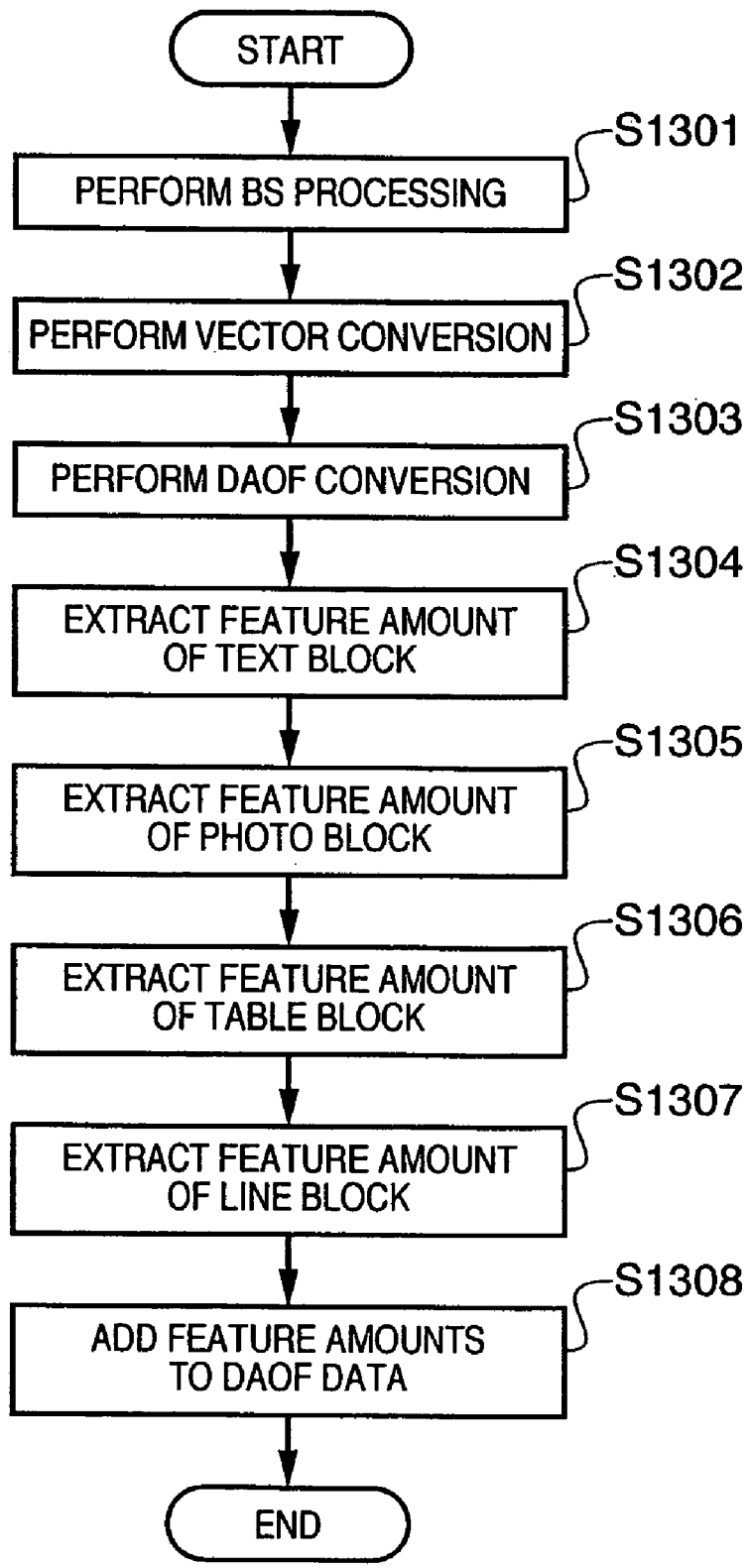
FIG. 11 is a flowchart showing processing which is executed by an index generator to generate a search index from image data.

FIG. 11 is a flowchart showing processing which is executed by the index generator 316 to generate a search index based on image data.

Image data is segmented into a text and line region and a photo region (segment of a photo attribute). Then, block selection (BS) processing is executed to further segment the text and line region into a segment of a text attribute to have paragraphs as clusters, that of a line attribute, that of a table attribute bounded by ruled lines, and that of a picture attribute (S1301). In this case, layout information indicating the layout of respective segments obtained by segmentation is used as the layout feature amount shown in FIG. 4.

Objects of respective segments except for the segment of the photo attribute are vector-converted (S1302), and obtained data are combined into document analysis output format (DAOF) data (S1303). A feature amount of a text block (S1304), that of a photo block (S1305), that of a table block (S1306), and that of a line block (S1307) are respective extracted from the DAOF data. These feature amounts are added to the DAOF data as index information (S1308).

BS Processing

Figure 12:
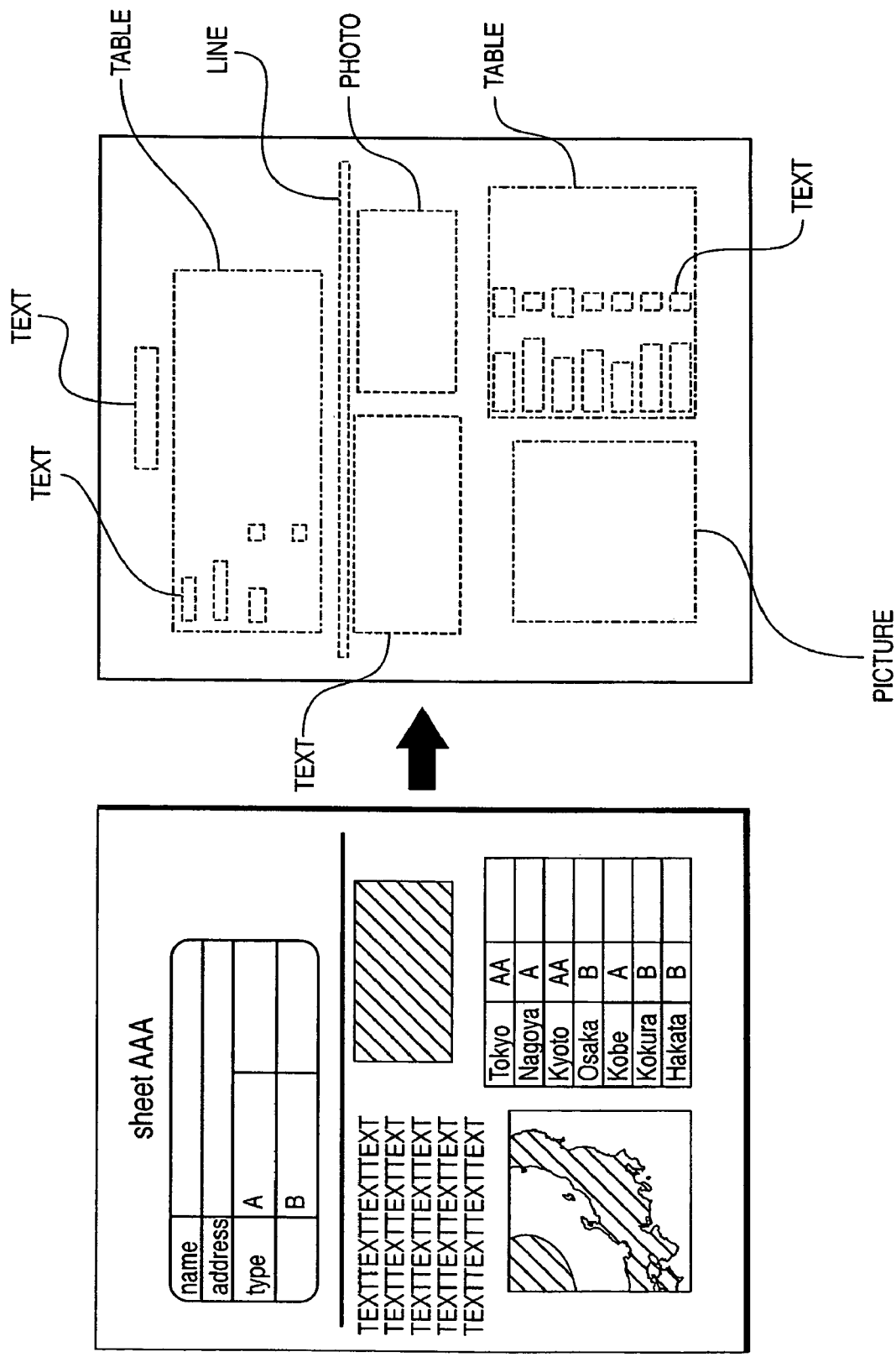
FIG. 12 is a view for explaining BS processing.

The BS processing is processing for recognizing the image for one page shown in FIG. 12 as a set of objects, determining attributes of the respective objects as TEXT, PICTURE, PHOTO, LINE, and TABLE, and segmenting them into segments (blocks) having different attributes. A practical example of block selection will be described below.

An image to be processed is binarized to a monochrome image, and a cluster of pixels bounded by black pixels is extracted by outline tracing. For a cluster of black pixels with a predetermined area or more, outline tracing is also made for white pixels in the cluster to extract clusters of white pixels. Furthermore, extraction of clusters of black and white pixels is recursively repeated so that a cluster of black pixels is extracted from a cluster of white pixels with a predetermined area or more.

Rectangular blocks which circumscribe the pixel clusters obtained in this way are generated, and their attributes are determined based on the sizes and shapes of the rectangular blocks. For example, a pixel cluster which has an aspect ratio close to 1, and has a size that falls within a predetermined range is determined as that of a text attribute. Furthermore, when neighboring pixel clusters of the text attribute regularly line up and can be grouped, they are determined as a text region. Also, a low-profile pixel cluster with a small aspect ratio is categorized as a line region. In addition, a range occupied by black pixel clusters that include rectangular white pixel clusters which have a predetermined size or more and a size close to a rectangle and regularly line up is categorized as a table region. Furthermore, a region where pixel clusters with indeterminate forms are distributed is categorized as a photo region. Other pixel clusters with an arbitrary shape are categorized as a picture region.

FIGS. 13A and 13B show an example of the block selection result. FIG. 13A shows block information of each extracted rectangular block. The block information includes an attribute, coordinates X and Y of a position, width W, height H, optical character recognition (OCR) information, and the like of each block. Attributes are given as numerical values 1 to 5: "1" indicates a text attribute; "2", a picture attribute; "3", a table attribute; "4", a line attribute; and "5", a photo attribute. The coordinates X and Y indicate the X- and Y-coordinates (those of the upper left corner) of a start point of each rectangular block of the input image, the width W and height H indicate the width in the X-coordinate direction and the height in the Y-coordinate direction of the rectangular block, and the OCR information indicates the presence/absence of it.

FIG. 13B shows input file information, which indicates the total number of rectangular blocks extracted by block selection.

The block information for each rectangular block is used in vector conversion of a specific region. Based on the block information, the relative positional relationship between the vector-converted specific region and raster data can be specified, and the vector-converted region and raster data regions can be combined without damaging the layout of the input image.

Vector Conversion Processing

The vector conversion processing applies adaptive processes to respective blocks according to their attributes, and converts them into highly compressed, high-quality data while realizing reusability of respective blocks. As the vector conversion, the following schemes are available.

(a) In case of a segment of the text attribute, a character pattern is converted into a character code by OCR processing, or is converted into visually faithful font data by recognizing the size, style, and face of a character.

(b) In case of a segment of the line or text attribute which cannot undergo character recognition by the OCR processing, an outline of a line image or character is traced, and outline information is converted into a format that expresses the line image or character as connection of line segments.

(c) In case of a segment of the picture attribute, an outline of a picture object is traced, and outline information is converted into a format that expresses outline information as connection of line segments.

(d) The outline information of a line segment format obtained by the scheme (b) or (c) undergoes fitting by a Bezier function or the like to be converted into function information.

(e) The shape of the picture is recognized based on the outline information of the picture object obtained by the scheme (c), and is converted into figure definition information such as a circle, rectangle, polygon, or the like.

(f) In case of a segment of the table attribute, ruled lines and frame borders are recognized, and are converted into form information of a predetermined format.

In addition to the aforementioned schemes, various kinds of vector conversion processing, which replace image data by command definition type information such as code information, picture information, function information, and the like are available.

Vector Conversion of Text Region

Figure 14:
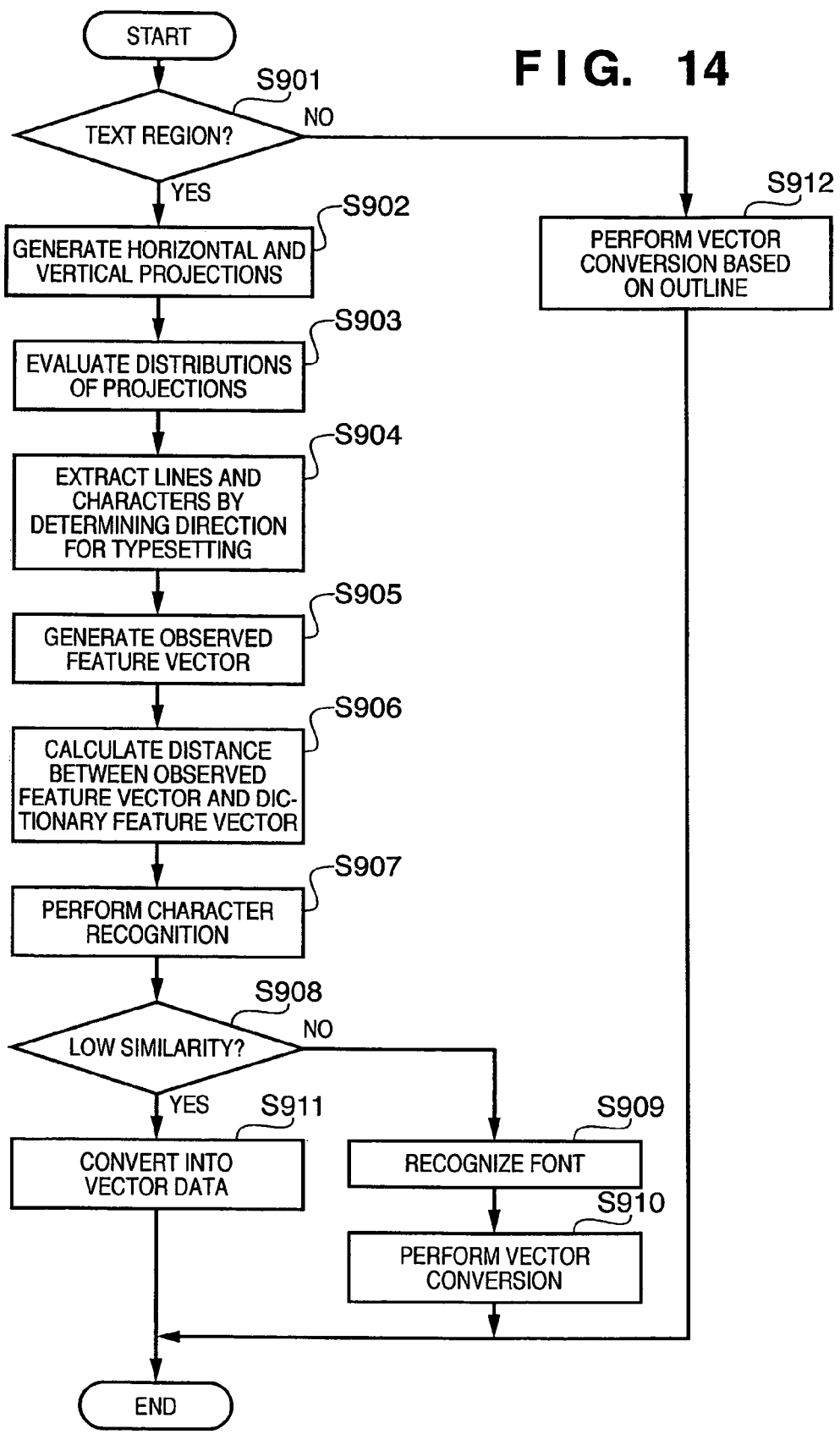
FIG. 14 is a flowchart showing details of vector conversion processing.

FIG. 14 is a flowchart showing details of the vector conversion processing, which is the processing executed by the data processor 15 (or management PC 101).

It is checked with reference to block information if a segment of interest is that of the text attribute (S901). If the segment of interest is that of the text attribute, the flow advances to step S902 to make character recognition using an arbitrary pattern matching scheme, thus obtaining a corresponding character code.

If the segment of interest is other than that of the text attribute, vector conversion based on the outline of the image is executed (S912), as will be described in detail later.

In case of the segment of the text attribute, horizontal and vertical projections of pixel values are calculated to determine horizontal or vertical writing (to determine the direction for typesetting) (S902). The distributions of the projections are evaluated (S903). If the distribution of the horizontal projection is larger, horizontal writing is determined; if that of the vertical projection is larger, vertical writing is determined. Based on this determination result, lines are extracted, and characters are then extracted, thus obtaining character images (S904).

Upon decomposition into a character string and characters, in case of horizontal writing, lines are extracted using the horizontal projection, and characters are extracted based on the vertical projection with respect to the extracted lines. For a vertical writing text region, columns are extracted using the horizontal projection, and characters are extracted from the vertical projection with respect to the extracted columns. Note that each character size can also be detected upon extracting lines and characters.

Next, for each extracted character, an observed feature vector obtained by converting the feature obtained from a character image into a several-ten-dimensional numerical value string is generated (S905). Feature vector extraction may use various known methods. For example, the following method may be used. That is, a character is segmented into meshes, lines which form the character in the meshes are counted as direction-dependent line elements, and a vector having dimensions as many as the number of meshes is defined as a feature vector.

The observed feature vector is compared with feature vectors which are calculated for respective character types and are stored in a feature dictionary to calculate distances between these vectors (S906). The calculated distances are evaluated, and a character type with a smallest distance is determined as a recognition result (S907). Based on the evaluation results of the distances, the smallest distance is compared with a threshold. If the smallest distance is less than the threshold, it is determined that the similarity is high; otherwise, it is determined that the similarity is low (S908). If the smallest distance is equal to or larger than the threshold (if the similarity is low), the character image of interest is more likely to be erroneously recognized as another character with a similar shape. Hence, the recognition result in step S907 is not adopted, the character image is handled in the same manner as a line image, and the outline of the character image is vector-converted (S911). In other words, for the character image which has high probability of a recognition error, visually faithful outline vector data is generated.

On the other hand, if the similarity is high, the recognition result in step S907 is adopted, and font information is output together with a character code, thus recognizing a character font (S909). Note that a plurality of feature dictionaries as many as character types used in character recognition are prepared in correspondence with character shape types, i.e., font types, thus attaining font recognition. Subsequently, each character is converted into vector data with reference to the character code and font information obtained by the character recognition and font recognition using outline data prepared in advance in correspondence with the character code and font information (S910). In case of color image data, a character color is extracted and is recorded together with vector data.

With the above processing, character images included in the segment of the text attribute can be converted into vector data which have approximately faithful shapes, sizes, and colors.

Vector Conversion Other than Text Region

For a segment other than that of the text attribute, i.e., that which is determined as the picture, line, or table attribute, black pixel clusters are extracted, and their outlines are converted into vector data. Note that a segment of the photo attribute and the background undergo data compression but they remain unchanged as image data without vector conversion.

Figure 15:
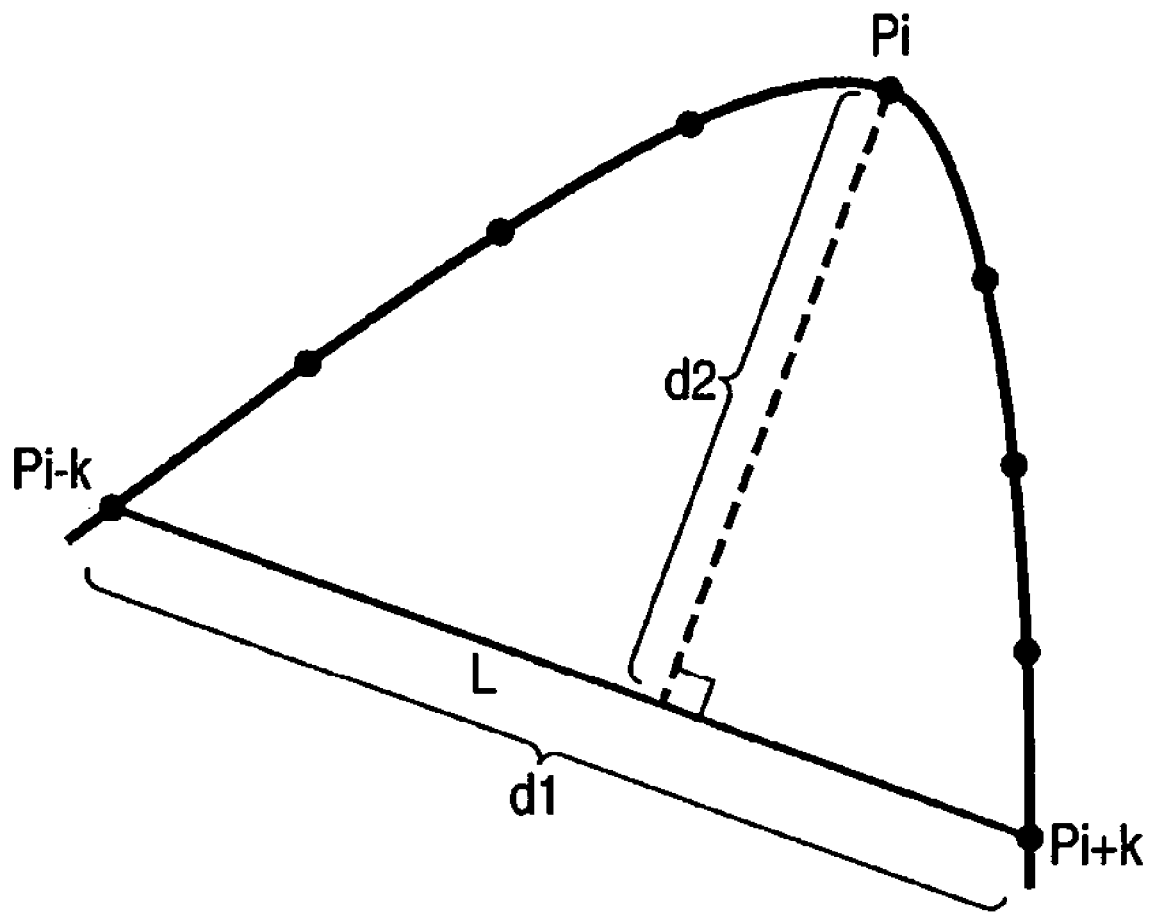
FIG. 15 is a view for explaining corner extraction processing in vector conversion.

Vector conversion of a region other than the text region detects a "corner" which segments a curve into a plurality of sections (pixel arrays), so as to express a line image or the like as a combination of straight lines and/or curves. FIG. 15 is a view for explaining corner extraction processing in vector conversion. A corner is a point which corresponds to a maximal curvature, and whether or not a pixel Pi on a curve shown in FIG. 15 is a corner is determined as follows.

The pixel Pi is defined as a starting point, and pixels Pi−k and Pi+k which are separated from the pixel Pi by the predetermined number k of pixels in two directions along the line image curve are connected by a line segment L. Let d1 be the distance between the pixels Pi−k and Pi+k, and d2 be the length (the distance between the pixel Pi and line segment L) of a line segment dropped from the pixel Pi to the line segment L to cross at right angles. If d2 becomes maximal, or if a ratio d1/A of a length A of an arc between the pixels Pi−k and Pi+k and the distance d1 becomes equal to or smaller than a predetermined threshold, the pixel Pi is determined as a corner.

After the corner is detected, pixel arrays of the line image curve segmented by the corner are approximated by straight lines or curves. Approximation to a straight line is executed by a method of least squares or the like, and that to a curve uses a ternary spline function or the like. The pixel of the corner that segments pixel arrays becomes the start or terminal end of the approximated straight line or curve.

Furthermore, it is checked if an inside outline of a white pixel cluster exists within the vector-converted outline. If such inside outline exists, that outline is vector-converted, and inside outlines of the black and white pixel clusters are recursively vector-converted, taking an inside outline in each inside outline.

As described above, using the method of approximating partial lines of an outline by straight lines or curves, the outline of a picture with an arbitrary shape can be vector-converted. When an input image is a color image, the color of a picture is extracted from the color image, and is recorded together with vector data.

Figure 16:
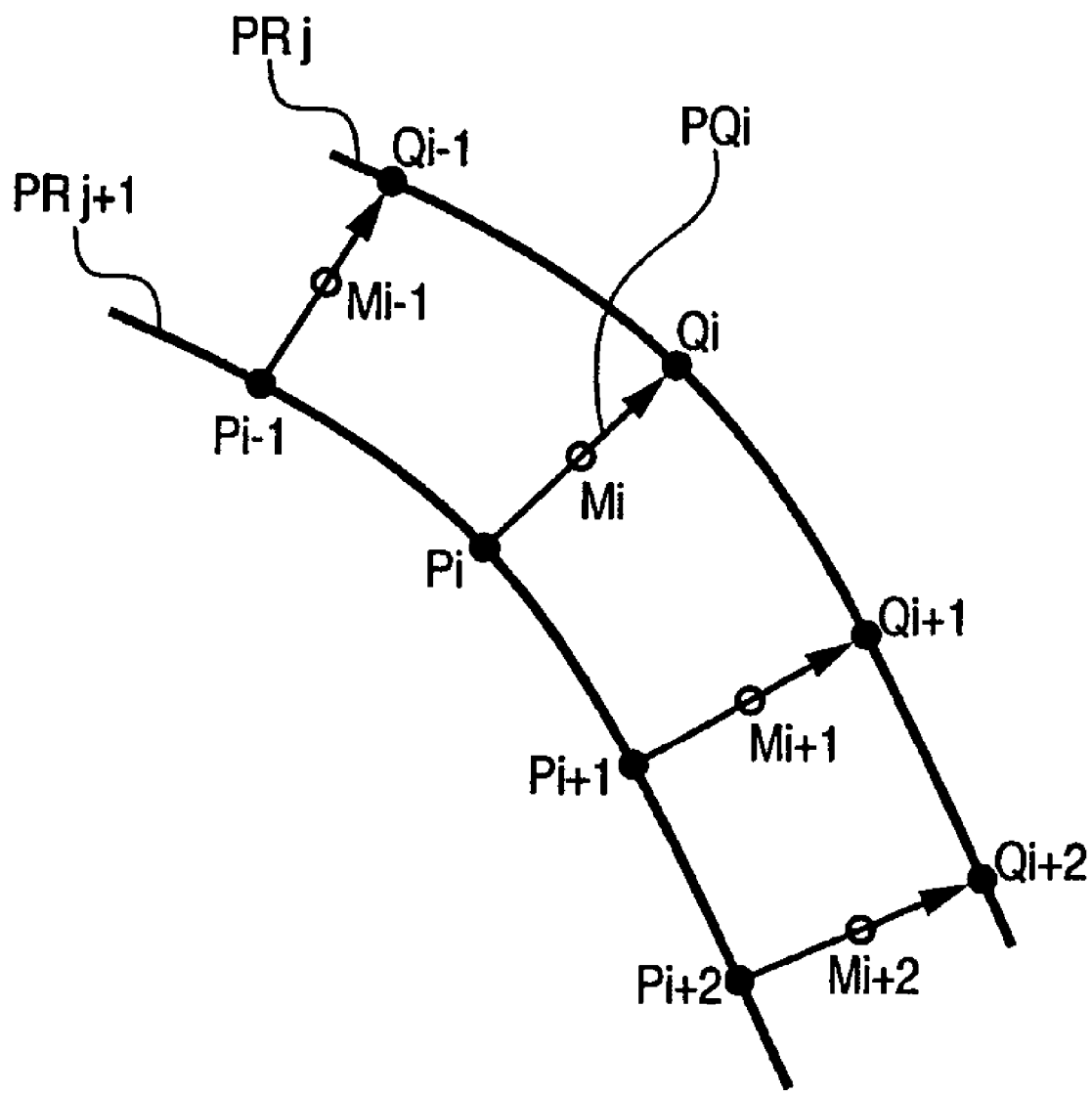
FIG. 16 is a view for explaining processing for grouping outlines in vector conversion.

FIG. 16 is a view for explaining processing for grouping outlines in vector conversion.

When an outside outline PRj is close to an inside outline PRj+1 or another outside outline within a section of interest of outlines, two or three or more outlines are combined to express a line having a given width. For example, distances PQi between pixels Pi on the outline PRj+1 and pixels Qi on the outline PRj which have shortest distances from the pixels Pi are calculated. When variations of the distances PQi between a plurality of pixels are slight, the section of interest of the outlines PRj and PRj+1 is approximated by a straight line or curve along a point sequence of middle points Mi of line segments PQi. The width of the approximated straight line or curve along the point sequence of the middle points Mi can be set to be the average value of the distances PQi.

A line or a table ruled line as a set of lines can be efficiently vector-converted by expressing them as a set of lines having a width.

Recognition of Picture

After the outlines of a line picture or the like are vector-converted, vector-converted partial lines are grouped for each picture object.

Figure 17:
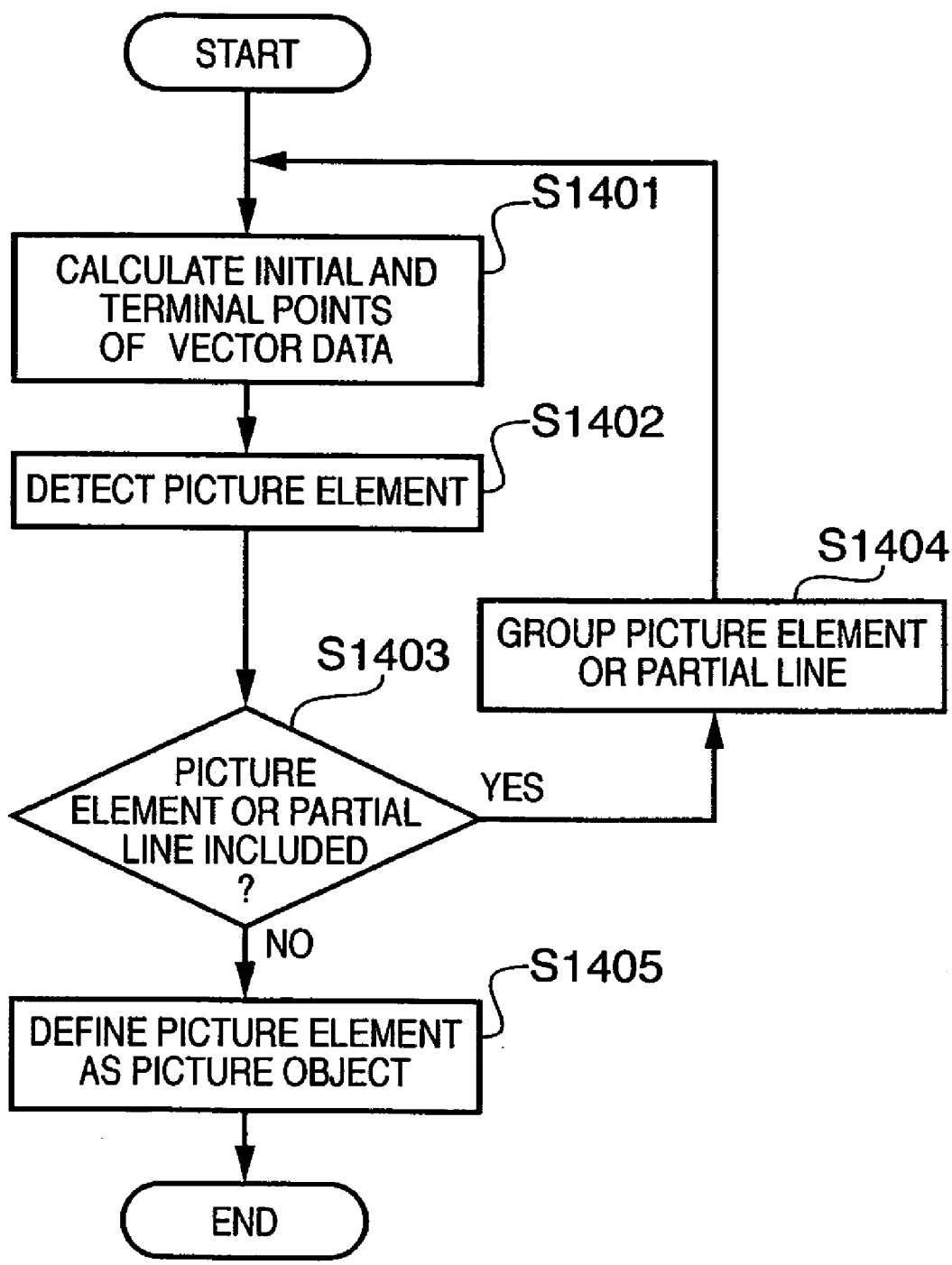
FIG. 17 is a flowchart showing grouping processing of vector data generated by vector conversion.

FIG. 17 is a flowchart showing grouping processing of vector data generated by vector conversion, i.e., processing for grouping vector data for each picture object.

Initial and terminal points of each vector data are calculated (S1401) to detect a picture element using the information of the initial and terminal points (S1402). Note that the picture element is a closed picture formed by partial lines, and vectors are connected at common corner pixels serving as the initial and terminal ends upon detection. That is, a principle that vector groups forming closed shapes have vectors to be connected at their two ends is applied.

Next, it is checked if another picture element or partial line exists in the picture element (S1403). If such picture element or partial line exists, steps S1401 and S1402 are recursively repeated. Then, these elements or lines are grouped to form a picture object (S1404). If no other picture element or partial line exists in the picture element, that picture element is defined as one picture object (S1405).

Note that FIG. 17 shows processing for only one picture object. If another picture object exists, the processing in FIG. 17 is repeated accordingly.

Detection of Picture Element

Figure 18:
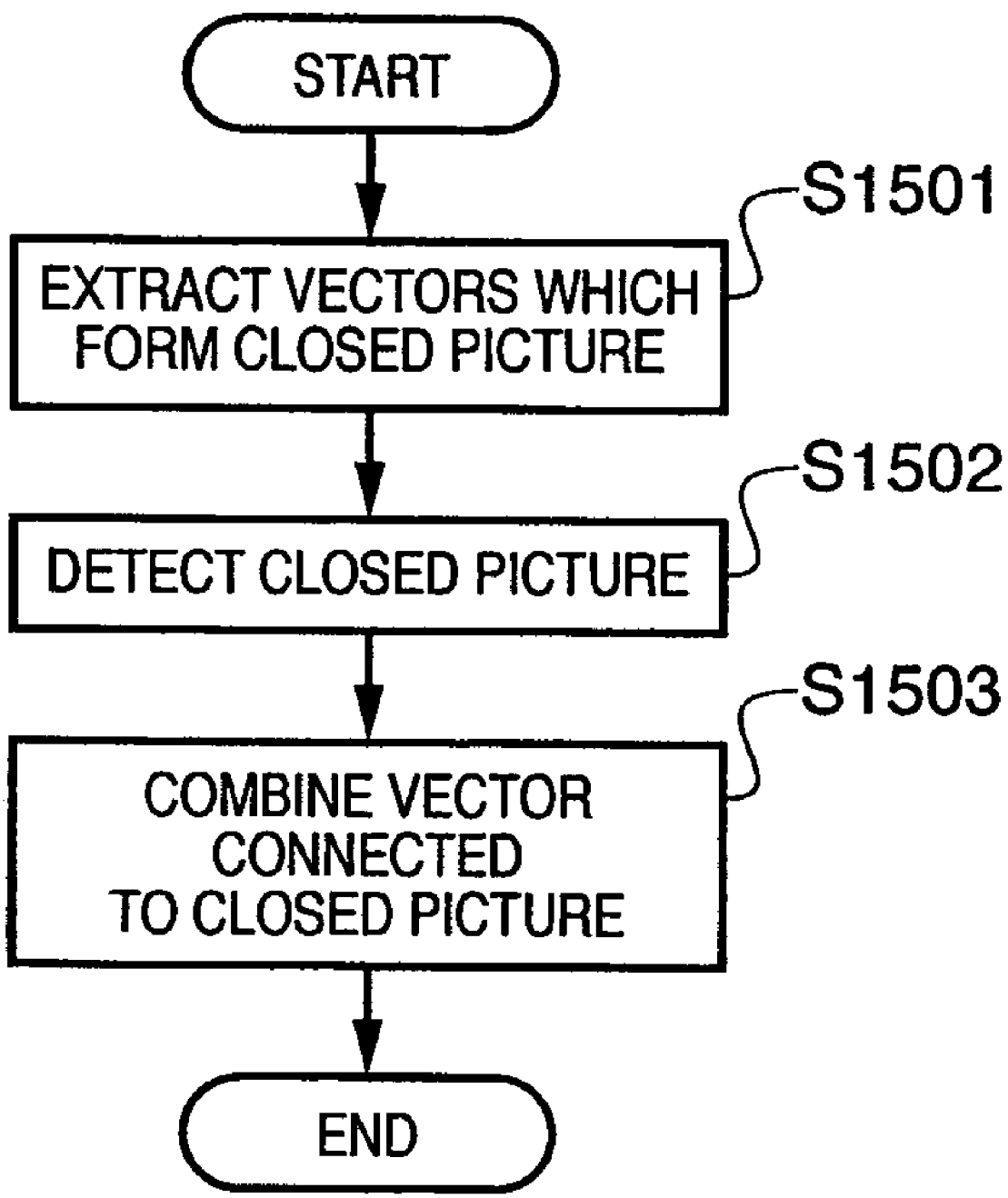
FIG. 18 is a flowchart showing detection processing of picture elements.

FIG. 18 is a flowchart showing the detection processing of picture elements.

Vectors which do not have any vectors, two ends of which are not coupled to other vectors, are excluded from vector data to extract vectors which form a closed picture (S1501).

As for the vectors which form the closed picture, one end point (initial or terminal point) of a vector of interest is set as a start point, and vectors are searched in a predetermined direction (e.g., clockwise). That is, the end point of the other vector is searched for at the other end point, and the closest end point within a predetermined distance is defined as an end point of a vector to be connected. When all the vectors which form the closed picture are traced once until the start point is reached, all the passed vectors are grouped as a closed picture which form one picture element (S1502). Also, all vectors which form a closed picture present in the closed picture are recursively grouped. Furthermore, the initial point of a non-grouped vector is set as a start point to repeat the same processing.

Of the excluded vectors, a vector (a vector to be connected to the closed picture) whose end point is close to the vectors grouped as the closed picture is detected, and the detected vector is grouped into that group (S1503).

Figure 19:
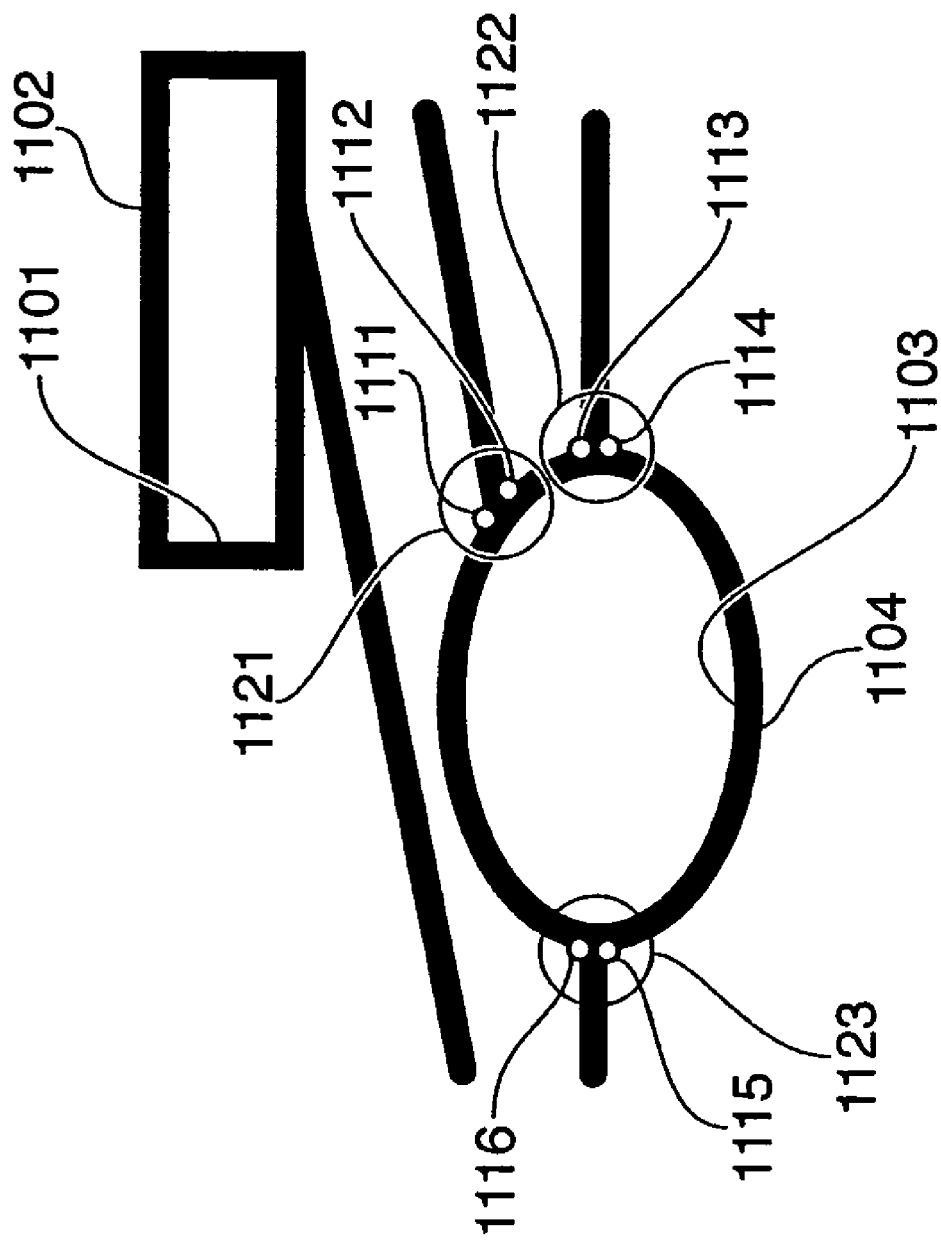
FIG. 19 is a view for explaining another method of recognizing a picture.

FIG. 19 is a view for explaining another method of recognizing a picture, and shows a vector image obtained by binarizing an image of a table attribute, and converting it into outline data.

For each of closed curves shown in FIG. 19, the curvature of an outline and information indicating the shape of a picture (information indicating a circle, ellipse, or polygon) based on corner information are extracted. A circle is determined by seeing if the curvature is constant, and an ellipse is determined using transition information of the curvatures. Also, a polygon is determined based on curvatures between neighboring corners. For example, information of a circle and rectangle can be extracted from the image shown in FIG. 19.

Next, the relationship between the extracted picture outlines and surrounding outlines is examined. For example, an outline 1103 will be explained in detail below. The outline 1103 is expressed as an elliptic curve with a given width based on the relationship between the curvatures between neighboring corners 1111 to 1116 indicated by symbols o on an outside outline 1104 corresponding to the outline 1103, and the distances between the neighboring corners. At this time, outlines between the corners 1111 and 1112, between the corners 1113 and 1114, and between the corners 1115 and 1116 are separated as those of portions which do not form an ellipse. When a binary image is converted into thin line data in advance, coupled portions 1121 to 1123 of the ellipse and lines can be efficiently extracted. Finally, straight line portions of respective outlines are detected, and it is checked if a straight line which forms a pair with the extracted straight line exists. If such straight line exists, these lines are replaced by a ruled line with a given width. Outlines which are not recognized as a picture are described intact.

With the above processing, pictures included in the segment of the picture attribute can be converted into reusable vector data which have approximately faithful shapes, sizes, and colors.

Recognition of Table

As for recognition of a table, cells and their configuration of a table are recognized, and a frame is expressed as a set of ruled lines.

Figure 20:
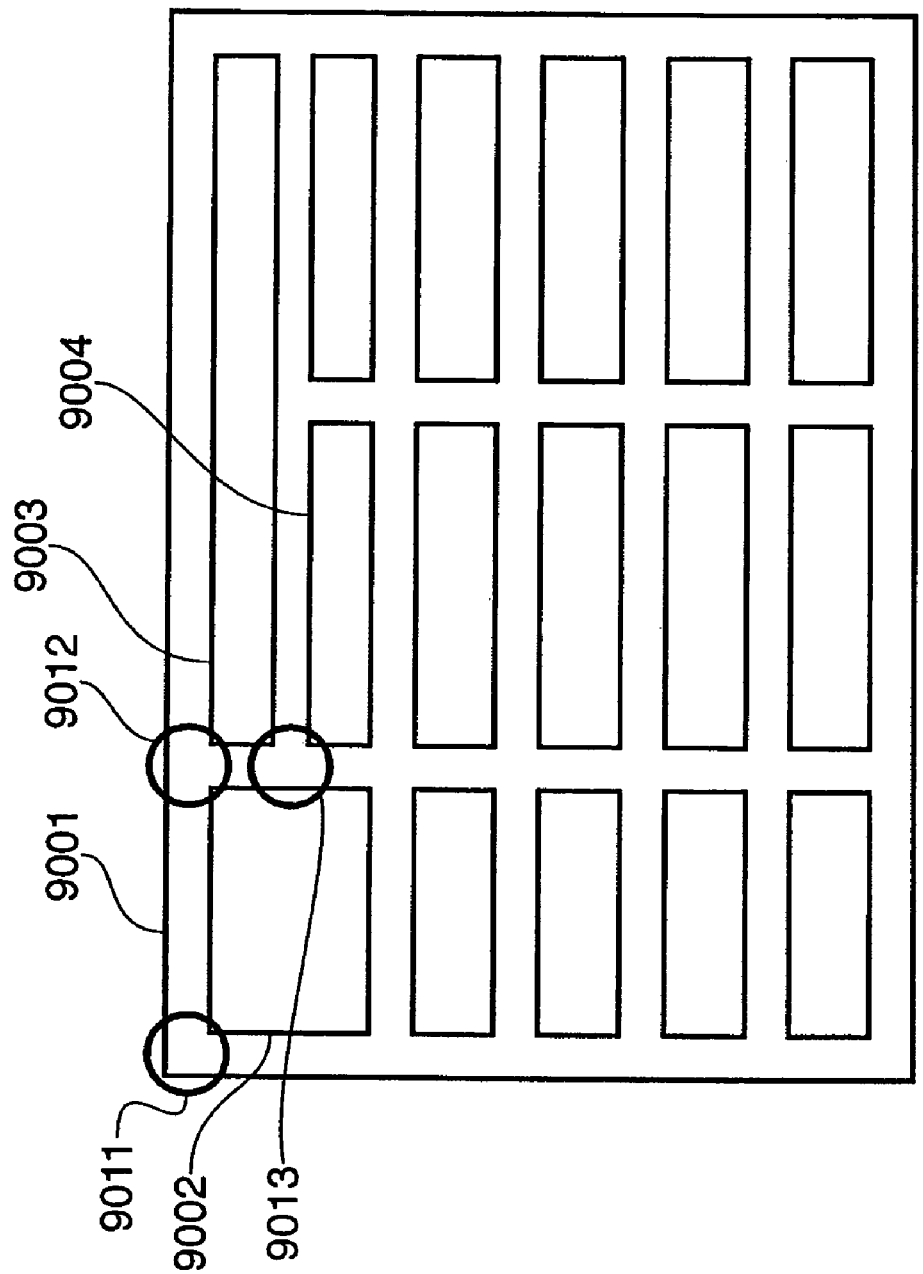
FIG. 20 shows a vector image which is converted into outline data by binarizing an image of a block of a table attribute.
Figure 21:
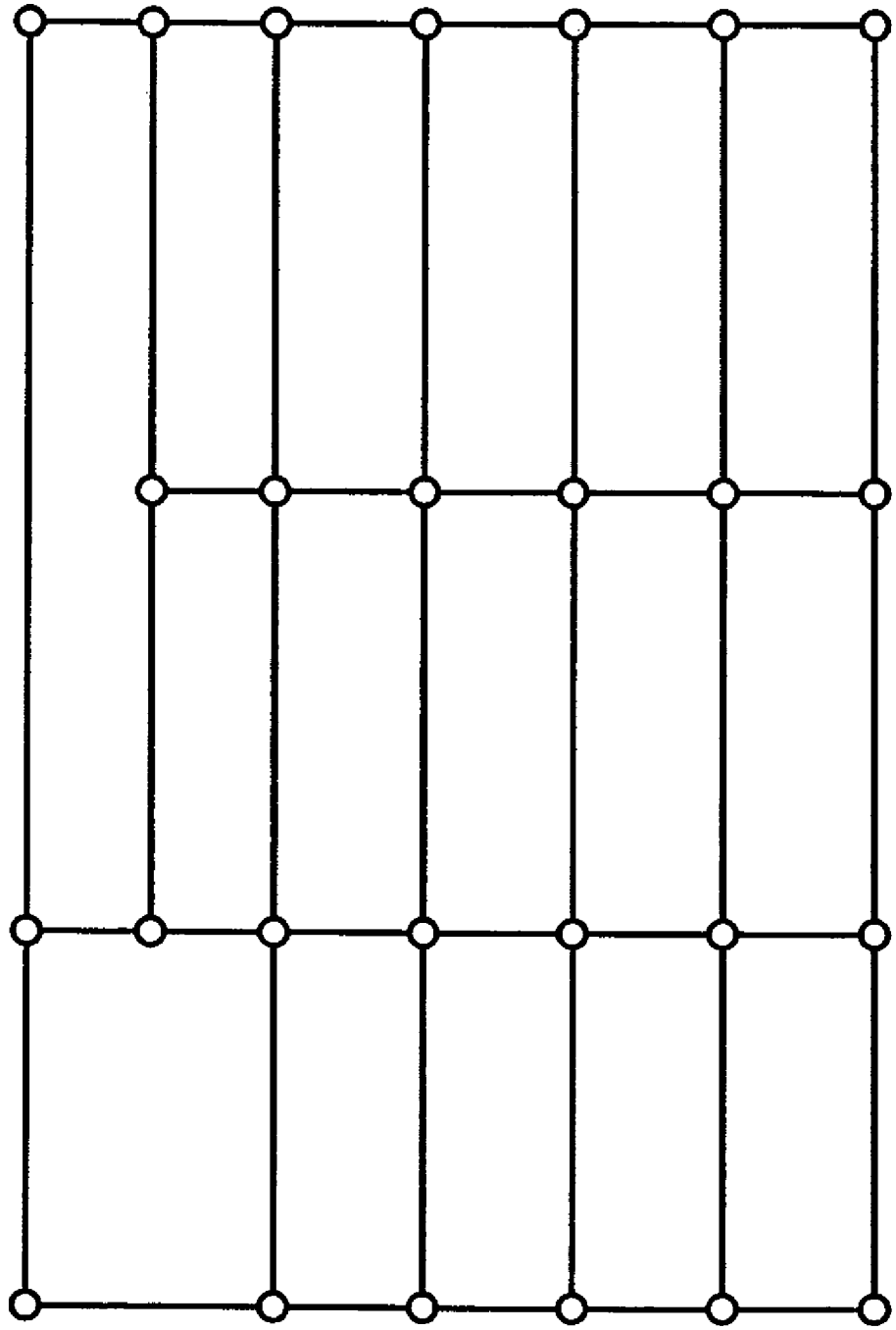
FIG. 21 shows a result when the corners of cells are obtained.

FIG. 20 shows a vector image obtained by binarizing an image of a block of the table attribute and converting it into outline data. After outline conversion, outside and inside outlines are obtained. For example, based on the relationship between an outside outline 9001 and inside outlines 9002, 9003, and 9004, corners 9011 and 9012 of cells are obtained. FIG. 21 shows the obtained result of cell corners. In FIG. 21, cell corners are indicated by symbols o, and ruled lines are indicated by the solid lines. In this manner, the cell configuration and position information of ruled lines are obtained. The positions of ruled lines are adjusted so that each ruled line passes between outside and inside outlines, and the width of each ruled line is determined based on the positional relationship between the outlines and ruled lines.

With the above processing, a table can be expressed by ruled lines having a predetermined width. Note that such processing for recognizing a table configuration based on a binary image is likely to extract a region painted in black. Such region is normally a cell, and but it is sometimes not extracted due to the threshold upon binarization processing. Hence, by checking edge information in the region or changing the threshold, an image of the region is binarized and is converted into outline data again, thus accurately extracting cells and faithfully vector-converting a table.

Segment of Photo Attribute and Background Region

As has already been described above, the segment of the photo attribute and the background region adaptively undergo data compression without vector conversion. As for the segment of the photo attribute and the background, JPEG-compressed data files are individually generated as raster data. In this case, since the background information means an unnecessary part in the image, image data is generated at a low resolution or at a high compression ratio if necessary, and the data size of DAOF data can be reduced.

DAOF Data

Figure 22:
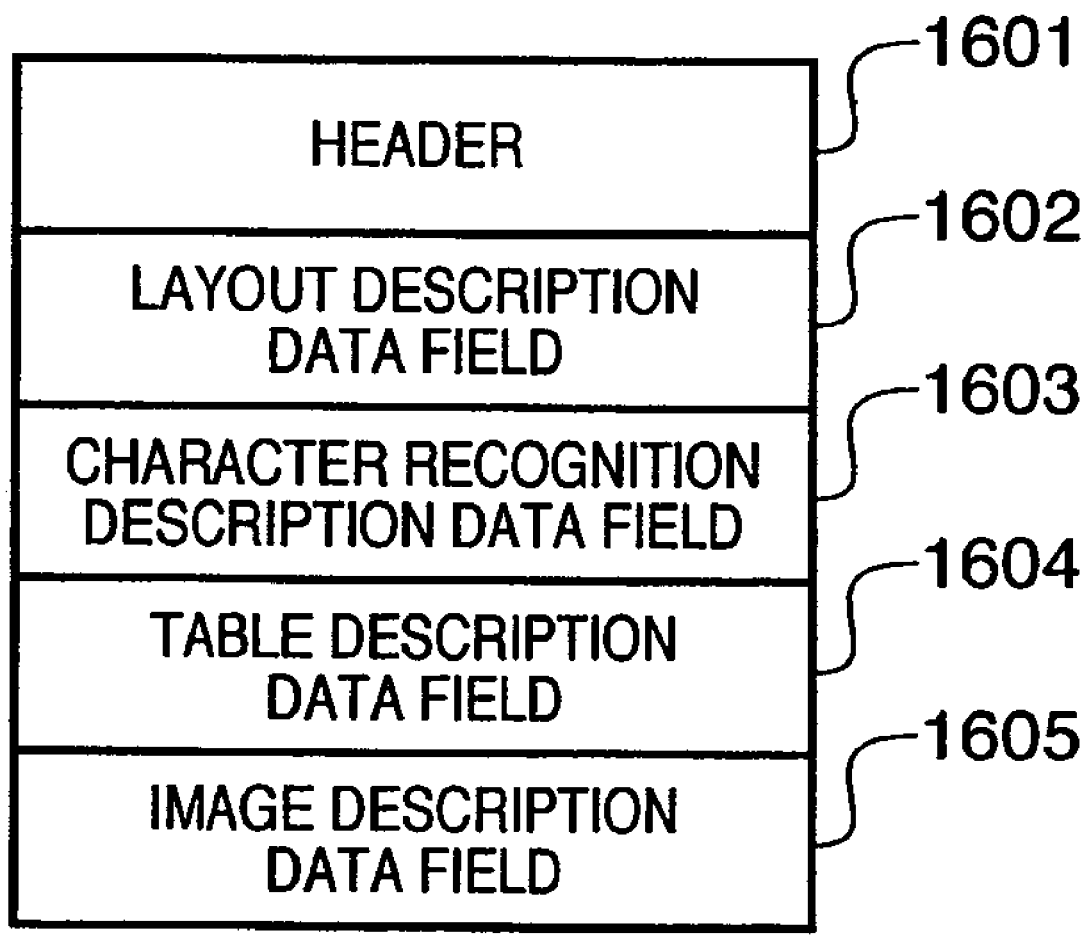
FIG. 22 shows the DAOF data structure obtained as a file of an intermediate data format as a result of applying BS processing of image data for one page and converting respective blocks into vector data.

FIG. 22 shows the DAOF data structure which is obtained as a file of an intermediate data format, as a result of BS processing and vector conversion of image data for one page.

The DAOF data includes a header 1601, layout description data field 1602, character recognition description data field 1603, table description data field 1604, and image description data field 1605. The header 1601 holds information that pertains to an input image to be processed.

The layout description data field 1602 which holds information such as text, title, caption, line image, picture, frame, table, photo, or the like, which indicate the attributes of rectangular segments in the input image, and the position information of these rectangular segments.

The character recognition description data field 1603 holds the character recognition result of a region designated by the user of rectangular segments of the text attribute (e.g., text, title, caption, or the like).

The table description data field 1604 holds details of the table structure of a rectangular segment of the table attribute. The image description data field 1605 holds image data extracted from the input image data in the rectangular segment of the picture attribute or line attribute.

The image description data field 1605 of the vector-converted designated region holds the internal structure of a segment obtained by vector conversion processing, and a set of data indicating the shape of an image, character code, and the like. For a segment other than the designated region, which does not undergo vector conversion, the field 1605 holds input image data itself.

Figure 23:
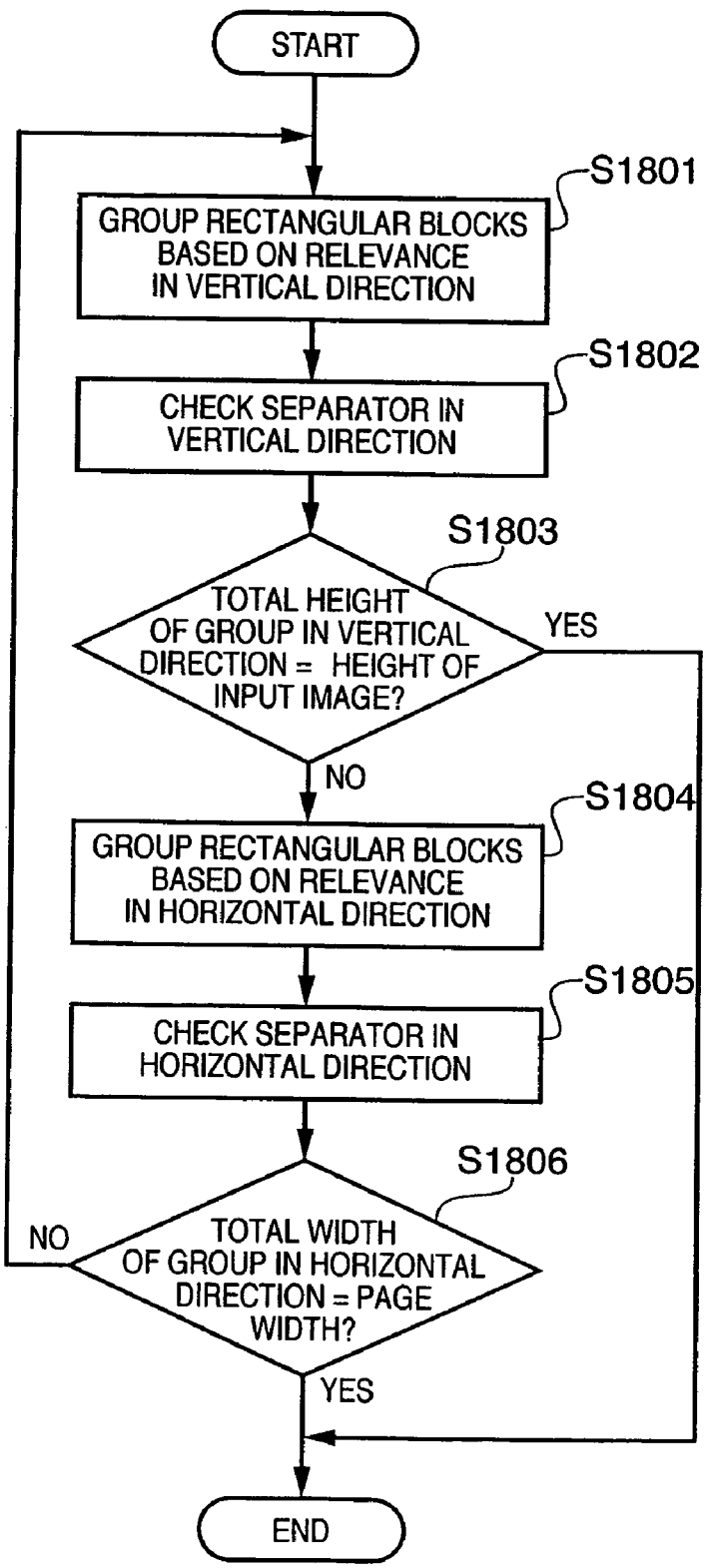
FIG. 23 is a flowchart showing details of document structure tree generation processing.

FIG. 23 is a flowchart showing details of the document structure tree generation processing (S1703). As a basic rule of the overall control in this processing, the flow of processes transits from a microblock (single rectangular block) to a macroblock (a set of rectangular blocks). In the following description, "rectangular block" implies both a microblock and macroblock.

Rectangular blocks are grouped for respective rectangular blocks on the basis of relevance in the vertical direction (S1801). Note that the processing shown in FIG. 23 is often repetitively executed. Immediately after the beginning of processing, determination is made for respective microblocks. Note that the relevance can be defined by features indicating if the distance between neighboring rectangular blocks is small, rectangular blocks have nearly the same block widths (heights in case of the horizontal direction), and so forth. Information of the distances, widths, heights, and the like can be extracted with reference to the DAOF data.

Figure 24:
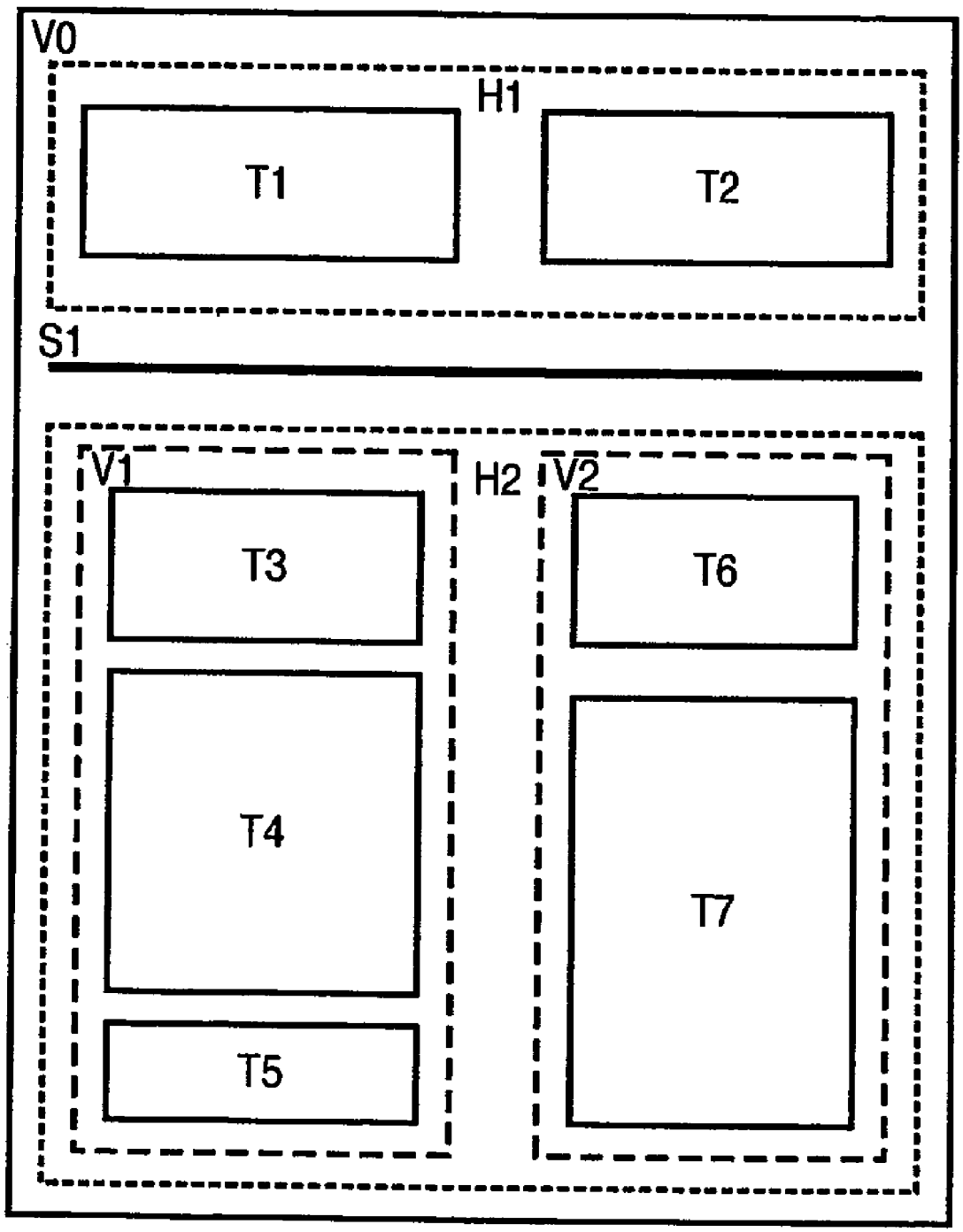
FIG. 24 shows an example of an image.

For example, in case of an input image shown in FIG. 24, rectangular blocks T1 and T2 are juxtaposed in the horizontal direction in its uppermost portion. A horizontal separator S1 is present below the rectangular blocks T1 and T2, and rectangular blocks T3, T4, T5, T6, and T7 are present below the horizontal separator S1. The rectangular blocks T3, T4, and T5 are laid out in the vertical direction from top to down on the left half portion of a region below the horizontal separator S1. The rectangular blocks T6 and T7 are laid out from top to down on the right half portion of the region below the horizontal separator S1.

If grouping based on the relevance in the vertical direction is executed in step S1801, the rectangular blocks T3, T4, and T5 are combined into one group (rectangular block V1) and the rectangular blocks T6 and T7 are combined into another group (rectangular block V2). The groups V1 and V3 belong to an identical layer.

Next, the presence/absence of a vertical separator is checked (S1802). The separator is an object having the line attribute in the DAOF, and has a function of explicitly separating blocks in application software. Upon detection of the separator, the region of the input image is divided into right and left regions to have the separator as a boundary in the layer to be processed. The example of FIG. 24 includes no vertical separator.

It is then checked if the total of the heights of the groups in the vertical direction is equal to that of the input image (S1803). That is, if grouping in the horizontal direction is done by shifting the region to be processed in the vertical direction (e.g., from top to down), the total of the heights of the groups becomes equal to that of the input image upon completion of the processing for the entire input image. By utilizing this fact, the end of processing is determined.

If grouping is not complete yet, rectangular blocks are grouped on the basis of relevance in the horizontal direction (S1804). In this way, the rectangular blocks T1 and T2 shown in FIG. 24 are combined into one group (rectangular block H1) and the rectangular blocks V1 and V2 are combined into one group (horizontal block H2). The groups H1 and H2 belong to an identical layer. Even in this case, immediately after the beginning of the processing, determination is made for respective microblocks.

Next, the presence/absence of the horizontal separator is checked (S1805). Upon detection of the separator, the region of the input image is divided into upper and lower regions to have the separator as a boundary in the layer to be processed. Note that FIG. 24 includes the horizontal separator S1.

It is checked if the total of the widths of the groups in the horizontal direction is equal to that of the input image (S1806). With this processing, it is checked if grouping in the horizontal direction is complete. If the total of the widths of the groups in the horizontal direction is equal to that of the input image (page width), the document structure tree generation processing ends. If the total of the widths of the groups in the horizontal direction is less than the page width, the flow returns to step S1801 to repeat the processing from the step of checking the relevance in the vertical direction.

Figure 25:
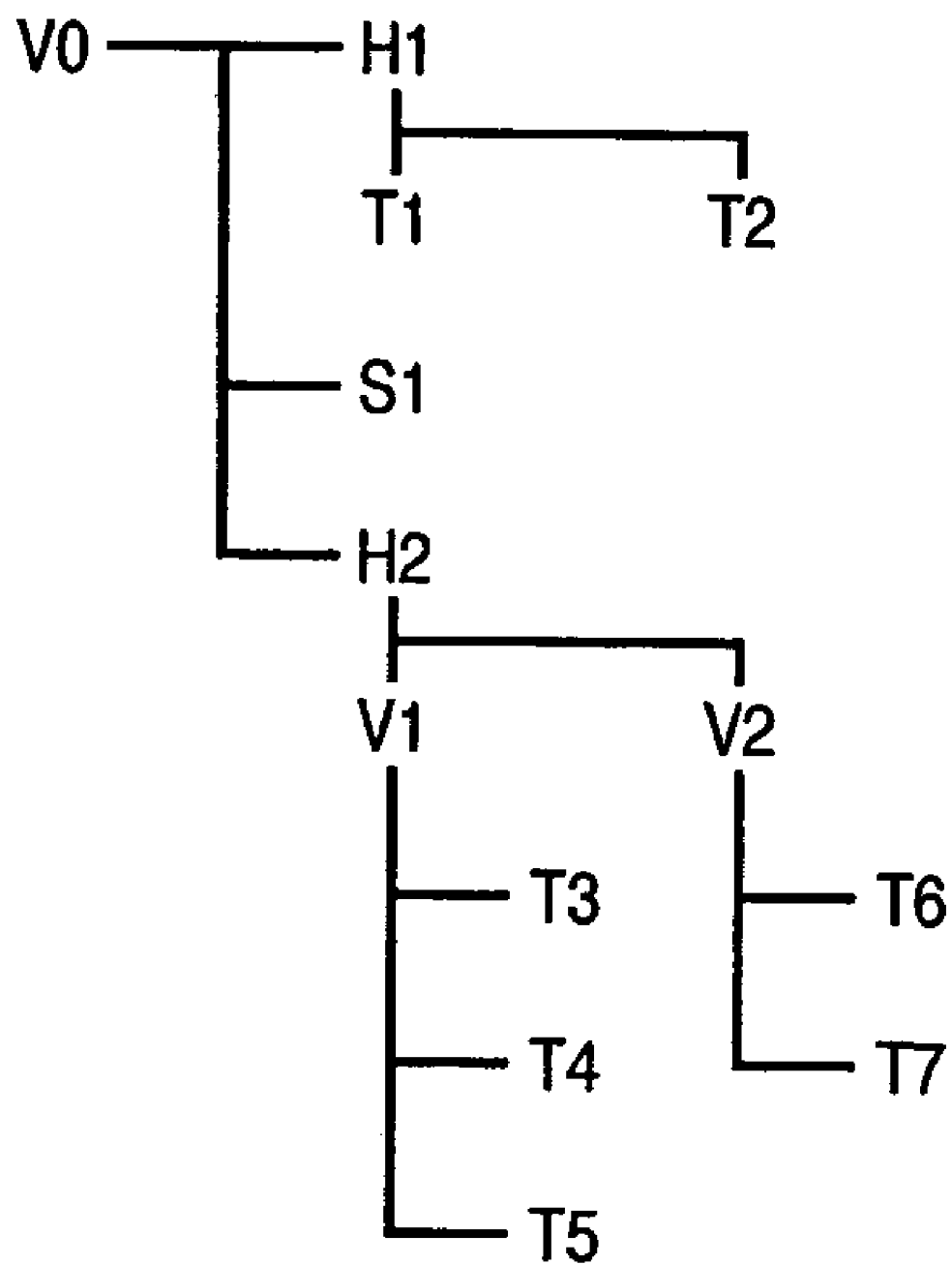
FIG. 25 shows a document structure tree obtained from the image shown in FIG. 24.

FIG. 25 shows the document structure tree obtained from an image V0 shown in FIG. 24.

The image V0 includes the groups H1 and H2, and the separator S1 in the uppermost layer, and the rectangular blocks T1 and T2 in the second layer belong to the group H1. The groups V1 and V2 in the second layer belong to the group H2. The rectangular blocks T3, T4, and T5 in the third layer belong to the group V1. The rectangular blocks T6 and T7 in the third layer belong to the group V2.

When the tree shown in FIG. 25 is reached, since the total of the widths of the groups in the horizontal direction becomes equal to the page width, the processing ends, and V0 of the uppermost layer indicating the entire page is finally appended to the document structure tree. After completion of the document structure tree, application data is generated based on that information.

Since the group H1 has the two rectangular blocks T1 and T2 in the horizontal direction, two columns are set, and the internal information (text as a character recognition result, image, and the like) of the rectangular block T1 is output to the first column (left column) with reference to the DAOF of T1. After that, the second column (right column) is selected, and the internal information of T2 is output. Then, the separator S1 is output.

Next, the group H2 is selected. Since the group H2 has the two rectangular blocks V1 and V2 in the horizontal direction, two columns are set, and internal information is output to the first column (left column) in the order of the rectangular blocks T3, T4, and T5 of the group V1. After that, the second column (right column) is selected, and internal information is output to the selected column in the order of the rectangular blocks T6 and T7 of V2.

Extraction of Feature Amounts (S1304 to S1307)

Initially, for a concept search, the feature amount of a text block is extracted from an object of the text attribute block. In the concept search to be described later, the meaning and context of input text are analyzed to search for a document associated with such contents. According to the concept search, even when no definite keyword is known, a document search can be done unlike in a normal search. Text used to generate a search index for the concept search is the one that has undergone character recognition or the one stored in application data.

Next, for a full-text search, the feature amount of a text block is extracted from an object of the text attribute block. Note that text used to generate a search index for the full-text search is the same as that used to generate a search index for the concept search.

For an image search, the feature amount is extracted from an object of a photo attribute block. For example, the photo attribute block is segmented into meshes, and the average color of respective meshes or the color distribution may be used as the feature amount.

Also, for a table search, the feature amount is extracted from an object of a table attribute block. The feature amount for the table search uses the configuration of cells. That is, the size and position of each cell which forms the table and text in each cell are used as the feature amount.

In addition, for a line image search, the feature amount is extracted from a picture or line attribute block. As the feature amount of a line image, information obtained by picture recognition is used: for example, the shape, position, size, and the like of a picture in addition to the positions, line widths, and lengths of lines which form the picture.

[Details of Document Registration]

The search indices are generated by the aforementioned search index generation processing. The DAOF-converted digitized data or application data is stored in a given folder of the storage unit based on the registration setting information and information indicating the registration location, which are set by the user, and is registered in the document management system. In the following description, the DAOF-converted digitized data or application data format will be referred to as "document data" together.

FIG. 26 shows an example of document data to be registered in the document management system. In the first embodiment, the database of the document management system is an XML (Extensible Markup Language) database, which stores XML data.

In the example shown in FIG. 26, document data is stored as BinHex-converted binary data in an original tag field 2301. A metaimage tag field 2303 stores analysis information associated with the document data. The search indices are stored in correspondence with blocks as minimum units in accordance with the DAOF-converted document data expression like tag fields 2304 to 2306. The data which have undergone the BS processing, vector conversion, and DAOF conversion may be stored intact in vectorgraphic tag fields 2307 to 2309. Note that the data which have undergone the BS processing, vector conversion, and DAOF conversion express document data in the original tag field 2301. For example, if the document data is digitized data, only a vector image is stored, and the digitized data need not be stored.

Since the search indices and vector images are stored for respective block, advanced searches such as a search for each block, extraction of block information, and the like can be conducted as expansion of a similar original search (to be described later).

A pdl tag field 2302 may store PDL data. When no PDL data is stored, the MFP 100 prints a document based on vector images of the search result. Alternatively, the MFP 100 prints a document based on application data of the search result using the application or printer driver of the management PC 101. However, when PDL data is stored, the MFP 100 can immediately print a document of the search result with high image quality using the PDL data.

Note that the storage format of the document data is determined based on the registration setting information set by the user.

Note that FIG. 26 shows an example in which document data and search indices are stored in a single XML file. If the search processing speed is to be improved, the search indices may be stored in a search index area (search table) in the storage unit together with link information to an XML data file.

[Search Processing]

The search processing of documents registered in the document management system will be described below.

Figure 27:
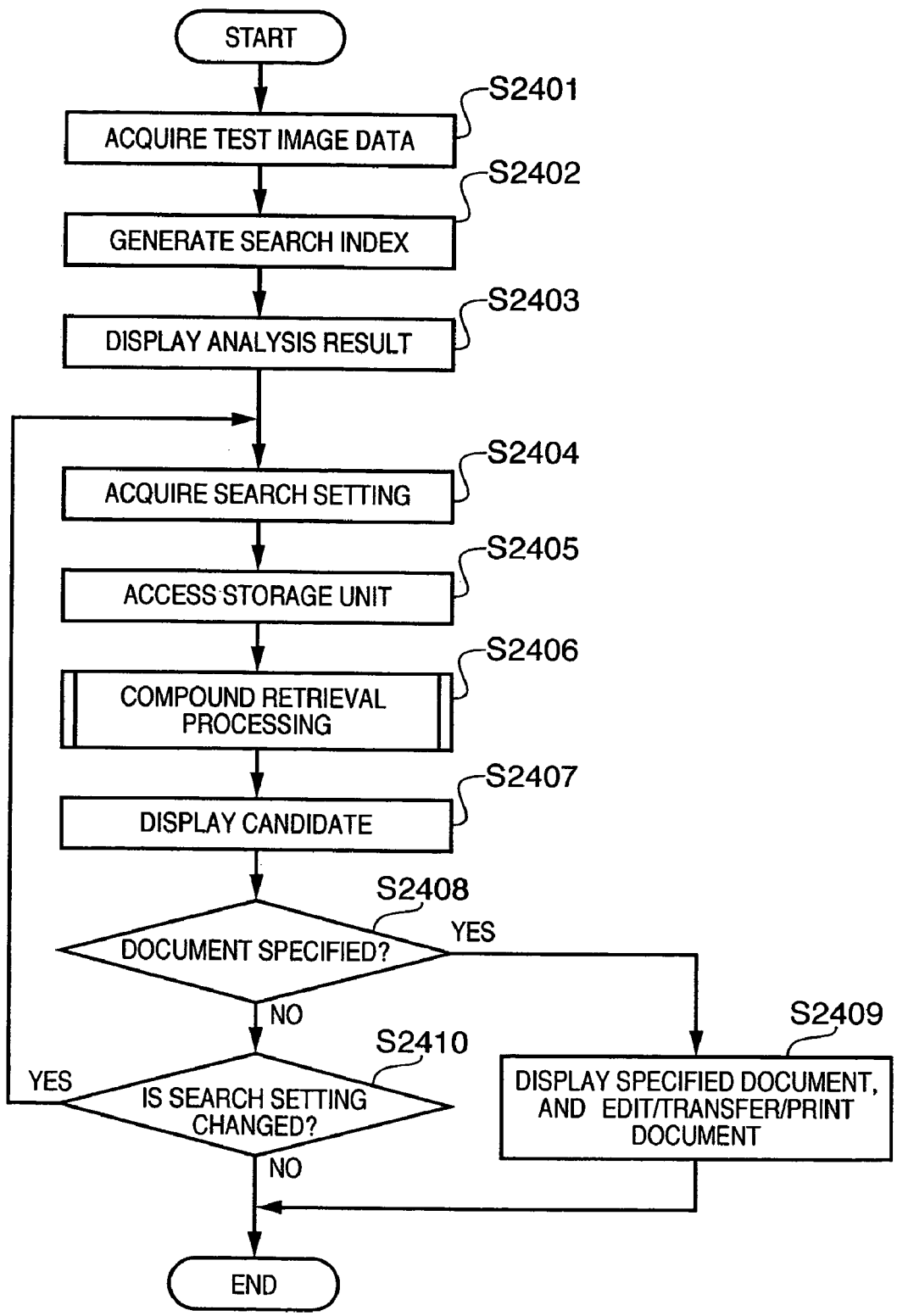
FIG. 27 is a flowchart for explaining document search processing of the document management system.

FIG. 27 is a flowchart for explaining the document search processing of the document management system. This processing may be executed by any of the CPU 1 of the management PC 101, the data processor 15 of the MFP 100, and the document management server 106. However, in the following description, assume that the this processing is executed by the data processor 15 of the MFP 100.

In FIG. 3, upon reception of a document search instruction from the user, the data processor 15 controls, e.g., the scanner 12 to scan an image of a test document, and controls the image processor 317 to perform input image processing (S2401). In place of scanning of a document image by the scanner 12, for example, image data of a test document image may be received from the client PC 102 via the communication controller 312.

Next, the data processor 15 sends the image data of the document image to the index generator 316, and segments the image data to generate search indices (S2402). Then, the data processor 15 displays vector images and block analysis information of generated DAOF data on the display 23 (S2403).

The user confirms the displayed vector images and block analysis information. The user then designates the storage unit to be searched if necessary by operating the control panel 20, and makes detailed search settings (i.e., to conduct a search in association with one block as the analysis result). The user then inputs a search instruction.

The data processor 15 acquires the user's search settings and search instruction (S2404), and accesses the storage unit based on the search settings (S2405), thus executing compound retrieval processing (to be described later) (S2406). As a result of search, if document data (candidates) with higher similarities are detected, the data processor 15 displays thumbnail images of candidates and the like on the display 23 (S2407). If a plurality of candidates are displayed, the user specifies a document from these candidates by operating the control panel 20.

The data processor 15 checks if the user specifies a document (S2408). If the user specifies a document, the data processor 15 displays the specified document on the display 23, and edits, transfers, or prints the document data in accordance with the user's instruction (S2409). If the user does not specify any document data, and presses a cancel button on the control panel 20 to indicate that he or she cannot detect desired document data, the data processor 15 displays a message indicating whether or not the search settings are to be changed on the display 23; and waits for user's decision (S2410). If the user instructs to change the search settings by operating the control panel 20, the data processor 15 controls the processing to return to step S2404.

Compound Retrieval Processing (S2406).

In the compound retrieval processing, the search indices (FIG. 4) of the input image data which has undergone the BS processing by the index generator 316 are sequentially compared with those (FIG. 4) of document data which have already been registered to search for matching or similar document data. That is, the coordinates, width, and height of each block are compared based on the layout feature amount, and the attribute of each block is compared based on the block feature amount. Note that comparison of the block feature amounts adopts different comparison methods depending on attributes.

Figure 28:
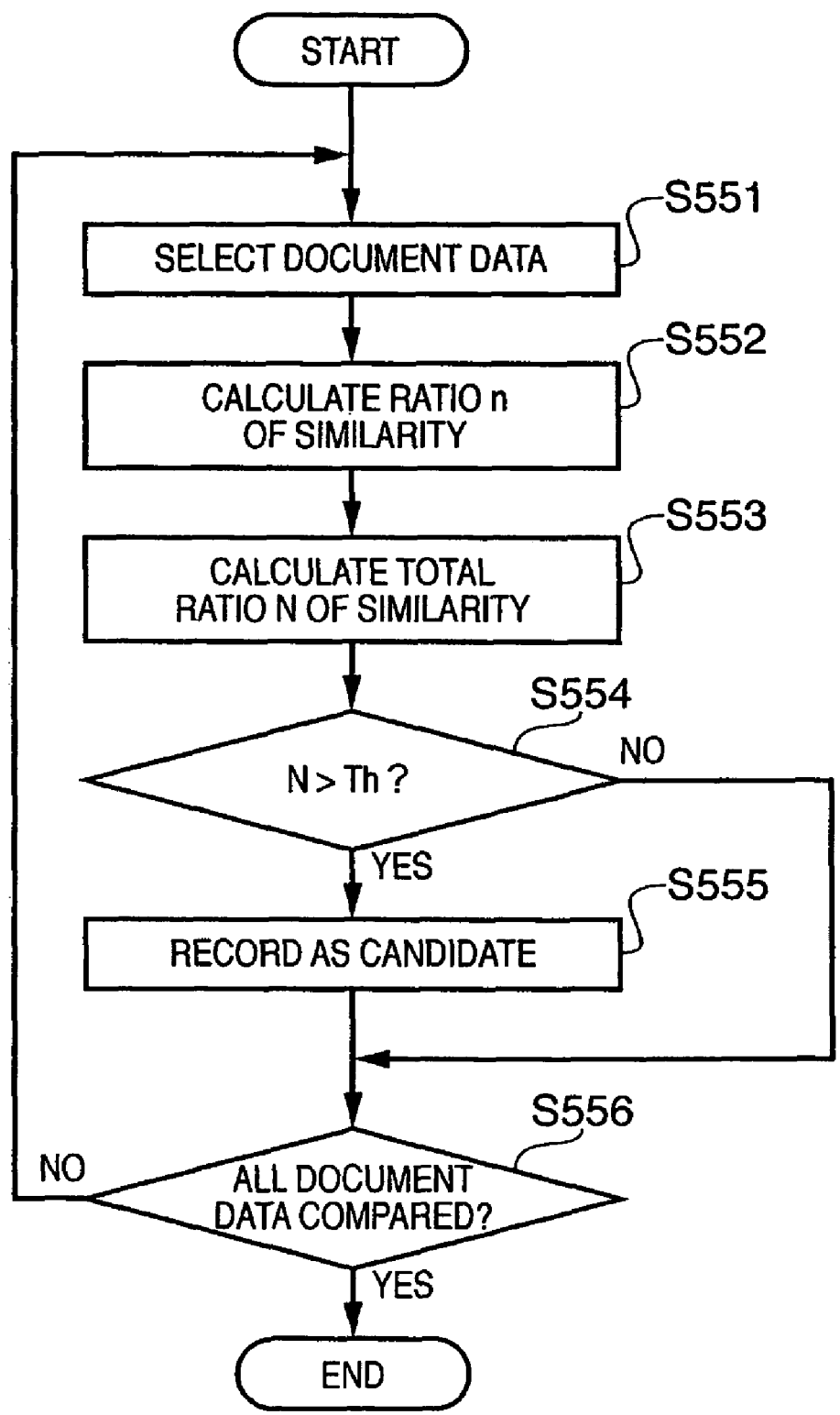
FIG. 28 is a flowchart for explaining compound retrieval processing.

FIG. 28 is a flowchart for explaining the compound retrieval processing.

The data processor 15 accesses the storage unit to select one document data (S551) to make comparison based on the layout feature amounts and that based on the block feature amounts, thus calculating the ratios of similarity with blocks of document data for respective blocks of input image data (S552).

A total ratio N of similarity is calculated using the ratios of similarity for respective blocks of the input image data (S553) by:

$$N = \Sigma w_i \times n_i + \gamma \quad (1)$$

where $n_i$ is the ratio of similarity of block i,
$w_i$ is a weighting coefficient used to evaluate the ratio of similarity of block i, and
$\gamma$ is a correction term.

Note that the correction term $\gamma$ is, for example, an evaluation value or the like of a block which is not selected from the document data. The weighting coefficient w is calculated based on the ratio of area occupied by the block in the document (occupation ratio). For example, let Sx be the area of block x. Then, a weighting coefficient $w_x$ of block x is calculated by:

$$w_x = Sx/\Sigma Si \quad (2)$$

where $\Sigma Si$ is the sum of the areas of all blocks.

By the weighting processing using such occupation ratio, the ratio n of similarity of a block which occupies a large area in the input image data is reflected more on the total ratio N of similarity.

The total ratio N of similarity is compared with a threshold Th (S554). If N>Th, the document data of interest is recorded as a candidate (S555), and a thumbnail image of the document data or the like is displayed. Subsequently, it is checked if the total ratios N of similarity are calculated for all document data registered in the storage unit (S556). If document data to be processed still remain, the flow returns to step S551.

Figure 29:
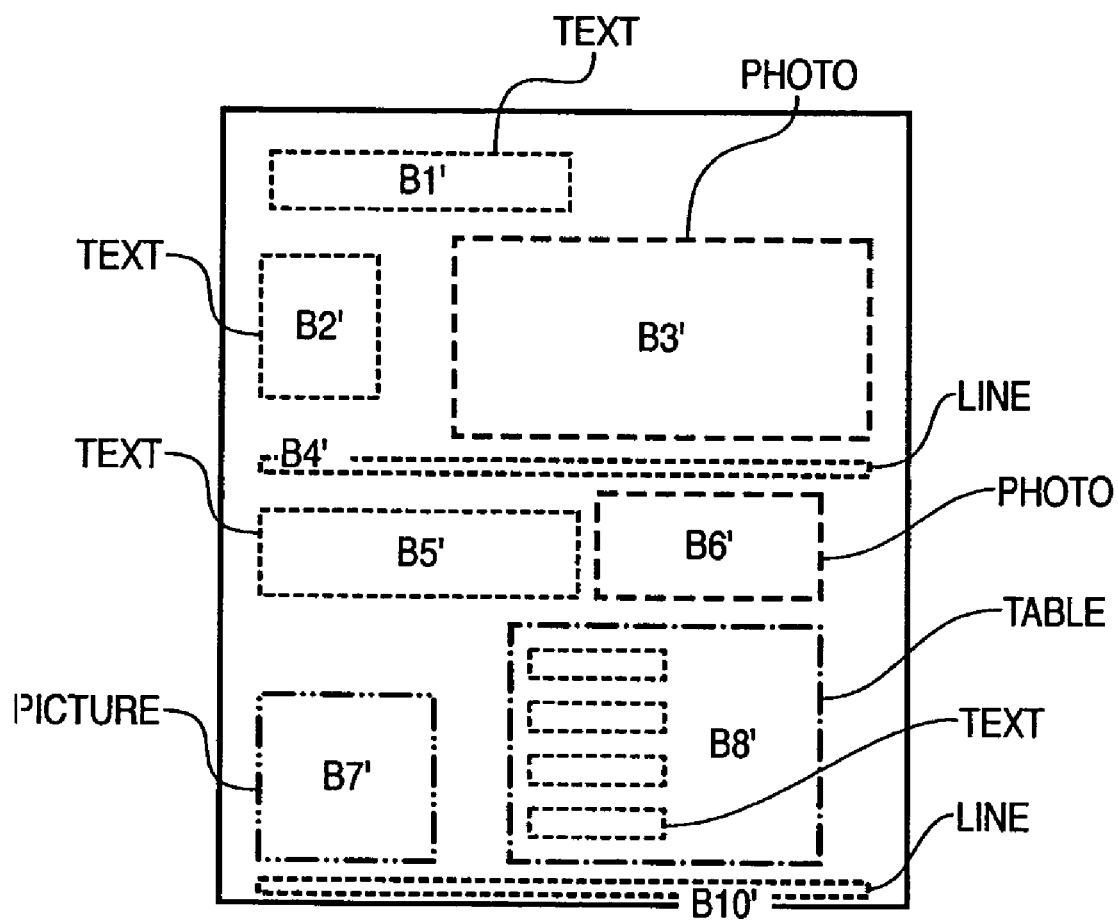
FIG. 29 shows an image example of registered document data.

For example, the image shown in FIG. 12 is input image data, and an image shown in FIG. 29 is an image example of registered document data. The document data shown in FIG. 29 is segmented into blocks B1' to B10', and data of the blocks except for the photo attribute block are vector-converted.

Figure 30:
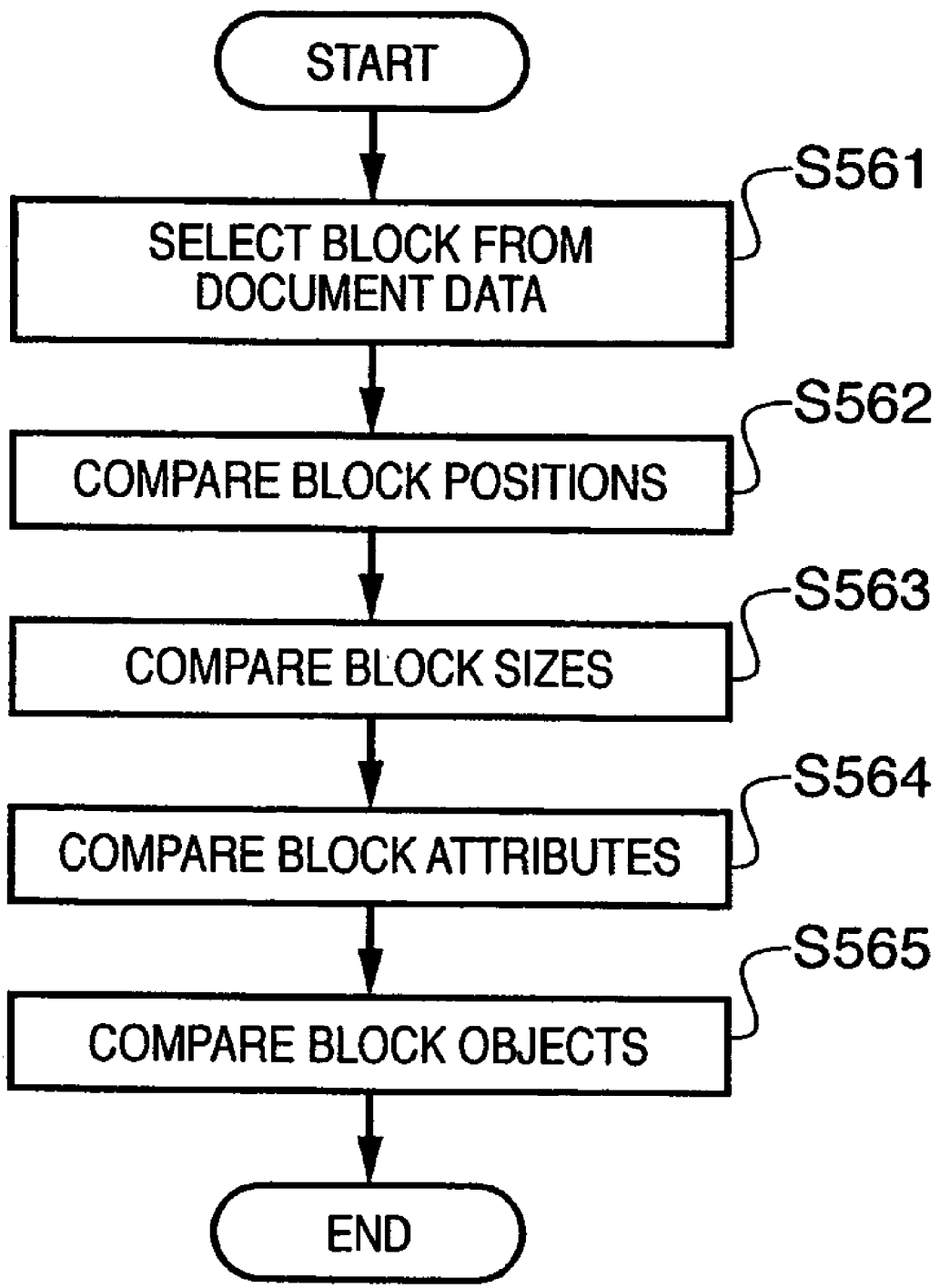
FIG. 30 is a flowchart showing details of processing for calculating the ratio of similarity of a block.

FIG. 30 is a flowchart showing details of the processing (S552) for calculating the ratio of similarity of each block.

Upon calculating the ratio of similarity of each block, a block of the document data which matches a block (to be referred to as "input block" hereinafter) of the input image data in terms of layout is selected (S561). Note that a single block of the document data may be selected for a plurality of blocks of the input image data.

The positions of the input block and selected block are compared (S562), their sizes are compared (S563), and their attributes are compared (S564), thus calculating the ratios of layout similarity based on their differences. Subsequently, objects of the blocks are compared to calculate the ratio of similarity between the blocks (S565). In this case, since the objects must be compared to have the same attribute, if they have different attributes, pre-processing for vector-converting one object again is done to match the attributes.

A total of the ratios of similarity of the positions, sizes, and attributes of the blocks, and the ratio of similarity of the objects of the blocks is used as a ratio of similarity of the blocks. Note that the processing shown in FIG. 30 is repeated for all blocks of the input image data.

Figure 31:
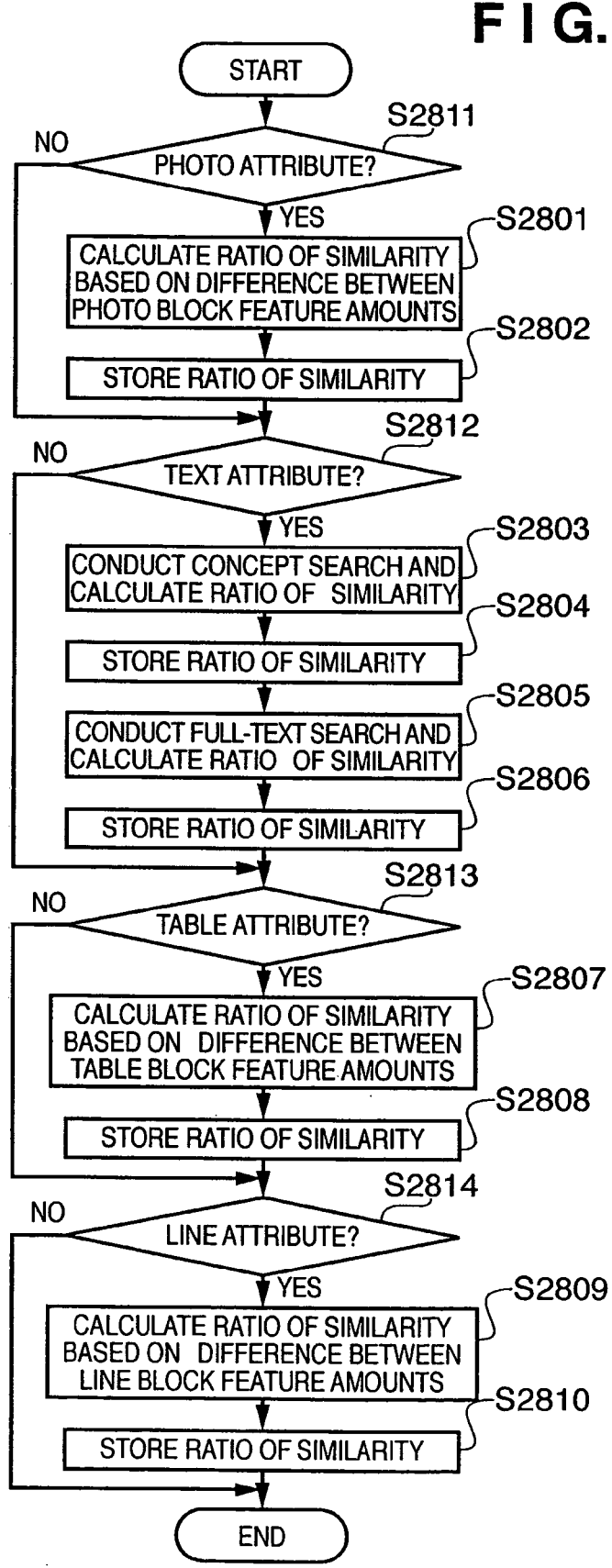
FIG. 31 is a flowchart showing a comparison method of blocks according to attributes.

Upon comparing the objects of the blocks, an optimal comparison method is applied depending on attributes. FIG. 31 is a flowchart showing the block comparison method depending on attributes.

If blocks to be compared have a photo attribute (S2811), a ratio of similarity is calculated from the difference between the photo block feature amounts of the input block and selected block (S2801), and the calculated ratio of similarity is stored in a predetermined area of the RAM 19 (S2802). As the photo block feature amount, a feature amount associated with a color such as the color distribution, color moment, or the like, a texture feature amount expressed by a cooccurrence matrix, contrast, entropy, Gabor transformation, or the like, a shape feature amount such as a Fourier descriptor or the like, and so forth may be used. Of these feature amounts, an optimal combination may be used.

If blocks to be compared have a text attribute (S2812), abstracts of the input block and selected block are generated based on character codes obtained by OCR processing upon generation of search indices, and a concept search is conducted to calculate a ratio of similarity (S2803). The calculated ratio of similarity is stored in a predetermined area of the RAM 19 (S2804). Subsequently, a full-text search as to whether or not keywords extracted from the input block are included in the selected block is conducted to calculate a ratio of similarity (S2805), and the calculated ratio of similarity is stored in a predetermined area of the RAM 19 (S2806).

If blocks to be compared have a table attribute (S2813), a ratio of similarity is calculated based on the difference between the table block feature amounts of the input block and selected block (S2807), and is stored in a predetermined area of the RAM 19 (S2808). The table block feature amount includes the number of cells, each cell size, cell configuration, text of each cell, and the like.

If blocks to be compared are line blocks of a line or picture attribute (S2814), a ratio of similarity is calculated based on the difference between the line block feature amounts of the input block and selected block (S2809), and is stored in a predetermined area of the RAM 19 (S2810). The line block feature amount includes the positions, widths, and lengths of lines which form a line image, and the type, position, size, shape, and the like of a picture.

In this way, the document management system which executes an advanced search function using image analysis information upon searching document images for digitized data can be provided. Especially, this document management system not only can register digitized data generated by scanning a document image to allow search, but also can similarly register application data as that unique to an application which runs on a computer to allow search. In other words, the document management system can equally handle the digitized data generated from a document image, and the application data.

Second Embodiment

A document management system according to the second embodiment of the present invention will be described below. Note that the same reference numerals in the second embodiment denote the same parts as those in the first embodiment, and a detailed description thereof will be omitted.

The first embodiment has explained the processing for searching document data based on an image scanned from a document. The second embodiment will explain processing for searching document data by passing PDL data from the client PC 102 (or management PC 101) to the document management system.

Figure 32:
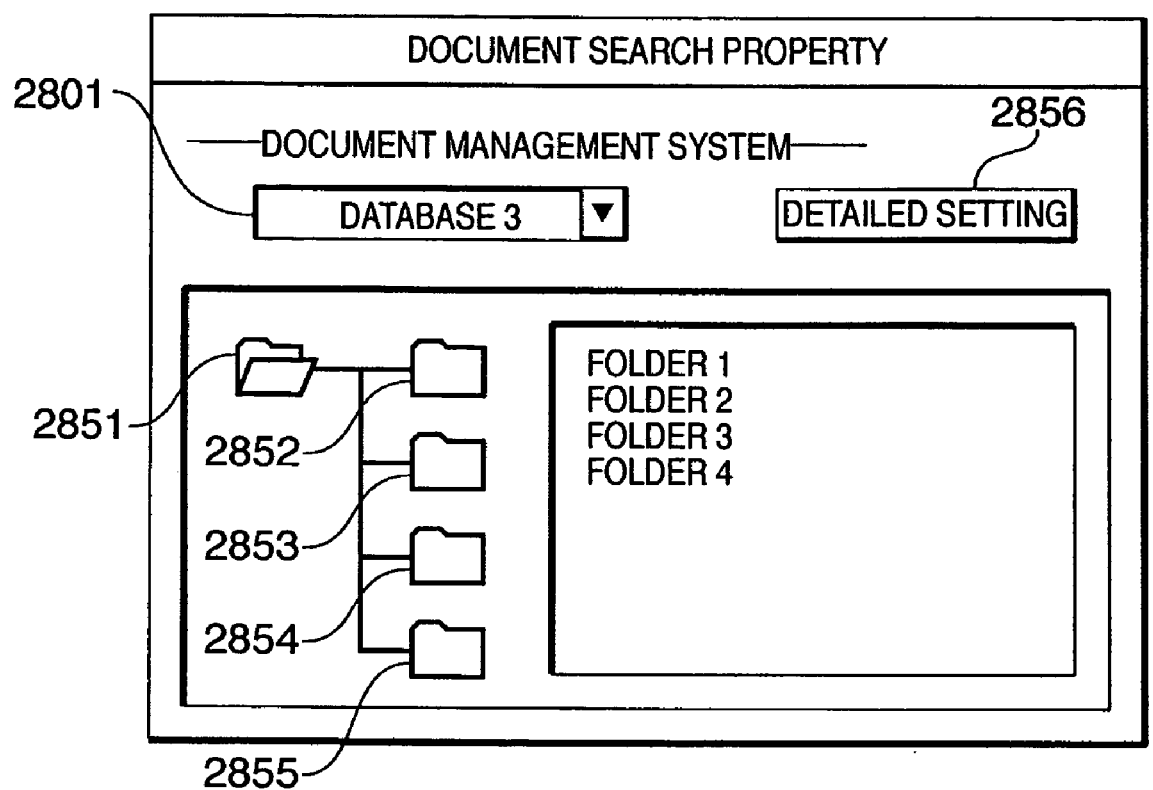
FIG. 32 shows a search setting window of a printer driver to which a document data search function is added.

FIG. 32 shows a search setting window of the printer driver 324 to which the document data search function is added.

The user selects the storage unit to be searched (displayed like "database 3" in FIG. 32) from a pull-down menu 2801, and also designates a folder to be searched by opening the folder displayed on a window 2802 if necessary. Note that FIG. 32 shows a state wherein document data registered in folders under a folder 2851 of database 3 are to be searched. Also, the user can make detailed search settings (e.g., to search for document data for two pages of application data, to mainly search text, and so forth) using a detail setting button 2856.

Upon completion of the search settings on the search setting window, if the user inputs a search instruction, PDL data embedded with search setting information is sent to the document management system as in the registration processing using the printer driver 324 which has been explained in the first embodiment. Upon reception of the PDL data for a search job, the document management system searches the designated storage unit, and returns a search result (e.g., a candidate list) to the printer driver 324. The printer driver 324 displays the received search result on the monitor 10. The user acquires desired document data from the document management system by specifying that document data from the candidate list displayed on the monitor 10.

Figure 33:
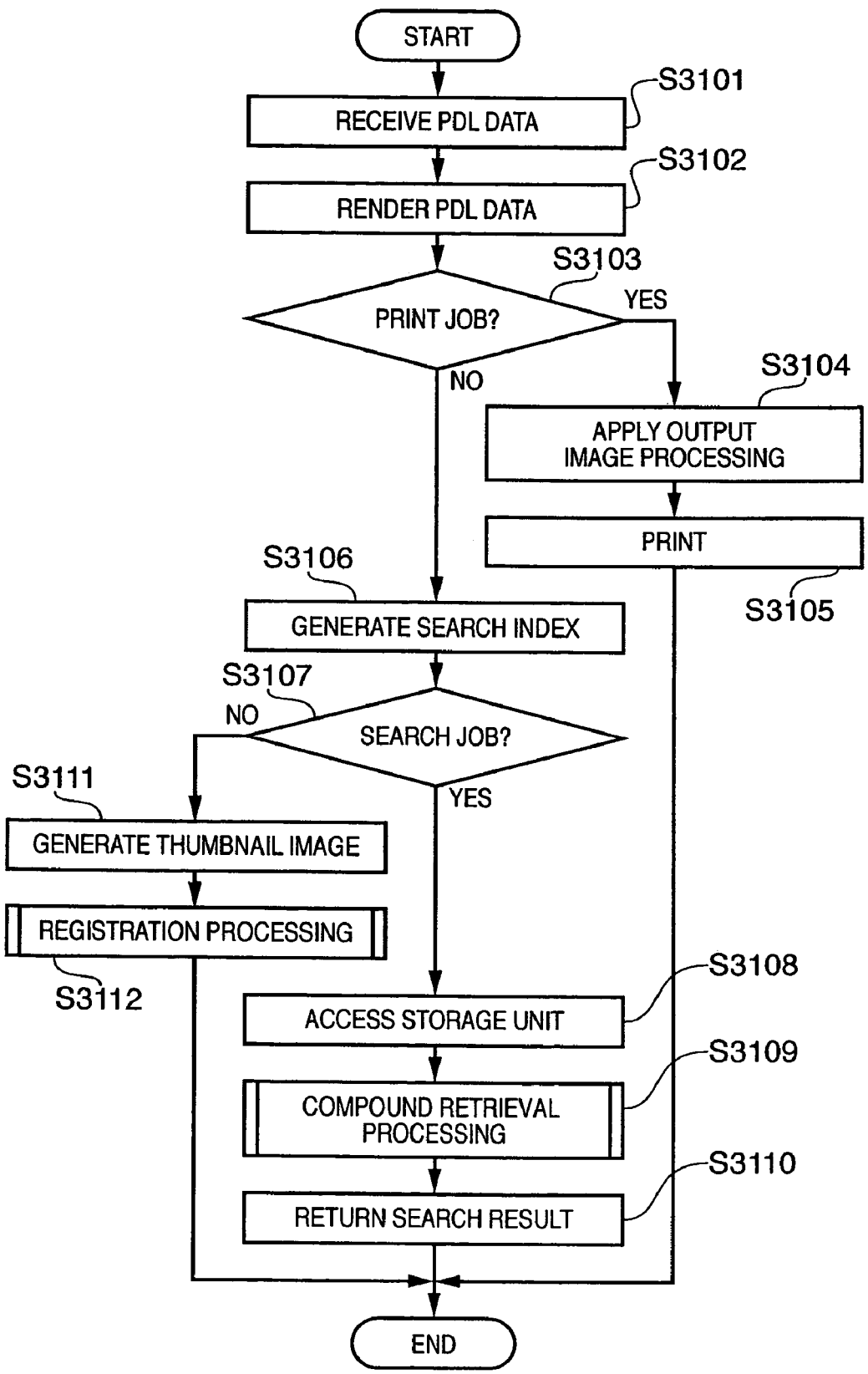
FIG. 33 is a flowchart for explaining registration and search processing of the document management system.

FIG. 33 is a flowchart for explaining registration and search processing of the document management system. As in the first embodiment, in the following description, assume that this processing is executed by the data processor 15 of the MFP 100.

Upon reception of PDL data from the client PC 102 via the communication controller 312 (S3101), the data processor 15 shown in FIG. 3 controls the renderer 314 to render the PDL data (S3102). In this case, if the search setting information or registration setting information is detected (S3103), the data processor 15 sends the rendered image data to the index generator 316 to generate a search index (S3106). If neither the search setting information nor registration setting information are detected, in other words, if the PDL data of a print job is input, the data processor 15 sends the rendered image data to the image processor 317 to apply output image processing (S3104), and controls the printer 17 to print the image data on a print sheet (S3105).

If the input PDL data is not a print job, the data processor 15 checks if that PDL data is a search or registration job (S3107). If the PDL data is a registration job, the data processor 15 generates a thumbnail image (S3111), and executes registration processing (S3112). If the PDL data is a search job, the data processor 15 accesses the designated storage unit based on the search setting information (S3108), conducts a compound retrieval (S3109), and returns the search result (e.g., a candidate list) to the printer driver of the client PC 102 (S3110).

In this manner, the document management system of the aforementioned embodiment can append the same search indices as those of image data scanned from documents to data of every applications upon registration without complicating and ballooning the document management system.

Therefore, application data and image data scanned from documents can be equally handled, registered, and searched.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-104363, filed Mar. 31, 2005, which is hereby incorporated by reference herein in its entirety.

What is claimed is:

1. An information processing apparatus comprising:
a setter, arranged to set application data to be registered in a data management system, wherein the application data is generated using an application program;
a determiner, arranged to determine whether or not the application data to be registered can be rendered by the data management system;
a converter, arranged to convert the application data which cannot be rendered by the data management system into description language data by using a printer driver, wherein the description language data can be rendered to form search information for the application data by the data management system, and further arranged to obtain registration data as a combination of the description language data and the application data which cannot be rendered by the data management system; and
a transmitter interface device, arranged to transmit over a network the application data or the registration data to the data management system in accordance with a determination result of the determiner so that the data management system registers received application data or registration data.

2. The apparatus according to claim 1, wherein the converter incorporates the application data in the description language data.

3. The information processing apparatus according to claim 1, wherein the application data is generated using an application program which is different from the printer driver.

4. An information processing method comprising the steps of:
setting application data to be registered in a data management system, wherein the application data is generated using an application program;
determining whether or not the application data to be registered can be rendered by the data management system;
converting the application data which cannot be rendered by the data management system into description language data by using a printer driver, wherein the description language data can be rendered to form search information for the application data by the data management system, and further obtaining registration data as a combination of the description language data and the application data which cannot be rendered by the management system; and
transmitting the application data or the registration data to the data management system in accordance with a determination result of the determining step so that the data management system registers received application data or registration data.

5. A non-transitory computer-readable medium storing a computer-executable program for causing a computer to perform an information processing method, the method comprising the steps of:
setting application data to be registered in a data management system, wherein the application data is generated using an application program;
determining whether or not the application data to be registered can be rendered by the data management system;
converting the application data which cannot be rendered by the data management system into description language data by using a printer driver, wherein the description language data can be rendered to form search information for the application data by the data management system, and further obtaining registration data as a combination of the description language data and the application data which cannot be rendered by the data management system; and
transmitting over a network the application data or the registration data to the data management system in accordance with a determination result of the determining step so that the data management system registers received application data or registration data.

* * * * *